US008004663B1

(12) United States Patent  
Melvin

(10) Patent No.: US 8,004,663 B1
(45) Date of Patent: Aug. 23, 2011

(54) HEADLAMP AIM DETECTION WITH SENSORS INDEPENDENT FROM HOST CONTROL UNIT

(76) Inventor: Stephen Waller Melvin, Vancouver (CA)

(*) Notice: Subject to any disclaimer, the term of this patent is extended or adjusted under 35 U.S.C. 154(b) by 0 days.

(21) Appl. No.: 13/013,033

(22) Filed: Jan. 25, 2011

Related U.S. Application Data

(63) Continuation of application No. 12/355,779, filed on Jan. 17, 2009, now Pat. No. 7,876,427.

(51) Int. Cl.
    *G01J 1/00* (2006.01)
(52) U.S. Cl. ........................................ 356/121
(58) Field of Classification Search ........... 356/121–137
    See application file for complete search history.

(56) References Cited

U.S. PATENT DOCUMENTS

| | | | |
|---|---|---|---|
| 3,467,473 A | | 9/1969 | Preston |
| 3,515,485 A | | 6/1970 | Irwin |
| 3,532,432 A | * | 10/1970 | Mansour ................ 356/121 |
| 3,603,691 A | * | 9/1971 | Hamilton .............. 356/152.1 |
| 3,746,449 A | | 7/1973 | Schick |
| 3,791,740 A | | 2/1974 | Proefrock |
| 3,830,570 A | * | 8/1974 | Groetzner et al. ...... 356/121 |
| 4,092,071 A | | 5/1978 | Puyplat |
| 4,120,589 A | | 10/1978 | Mima |
| 4,134,680 A | | 1/1979 | Hunter |
| 4,634,275 A | | 1/1987 | Yoshida |
| 4,647,195 A | | 3/1987 | Ishikawa |
| 4,744,655 A | | 5/1988 | Sdika |
| 4,907,877 A | | 3/1990 | Fukuda |
| 5,078,490 A | * | 1/1992 | Oldweiler et al. ...... 356/121 |
| 5,170,220 A | | 12/1992 | Matsumoto |
| 5,210,589 A | | 5/1993 | Kaya |
| 5,318,172 A | | 6/1994 | Kenny |
| 5,321,439 A | | 6/1994 | Rogers |
| 5,331,393 A | | 7/1994 | Hopkins |
| 5,373,357 A | | 12/1994 | Hopkins |
| 5,379,104 A | * | 1/1995 | Takao ...................... 356/121 |
| 5,392,111 A | * | 2/1995 | Murata et al. .......... 356/121 |
| 5,426,500 A | | 6/1995 | Ohana |
| 5,485,265 A | | 1/1996 | Hopkins |
| 5,504,574 A | | 4/1996 | Murata |
| 5,619,322 A | | 4/1997 | Murata |
| 5,751,832 A | | 5/1998 | Panter |

(Continued)

OTHER PUBLICATIONS

Philips Semiconductors, P8xC591 Single-chip 8-bit microcontroller with CAN controller, Jul. 26, 2000.

(Continued)

*Primary Examiner* — Gregory J Toatley
*Assistant Examiner* — Jarreas C Underwood
(74) *Attorney, Agent, or Firm* — Stephen W. Melvin

(57) ABSTRACT

Headlamp alignment is detected using a collection of intelligent, independent sensor units, each of which incorporates a vertical array of sensing elements capable of detecting headlamp illumination. The sensor units are networked together and can be coupled to a host controller. The host controller can provide a user interface via a touch screen and a Web server, and can further communicate with a plant network for interfacing with manufacturing databases. The network of sensor units can accommodate four or more sensors, which allows multiple vehicles and multiple headlamp types to be audited without physical movement of the sensor units. The sensor units are low in power consumption and can receive power over the same cable providing network communication. Incorporation of non-volatile memory within the sensor units allows factory data to be recorded within each sensor unit and permits convenient replacement of units in the field.

30 Claims, 16 Drawing Sheets

U.S. PATENT DOCUMENTS

| | | | |
|---|---|---|---|
| 5,796,473 | A | 8/1998 | Murata |
| 5,818,571 | A | 10/1998 | Prettyjohns |
| 7,275,847 | B2 | 10/2007 | Kiyota |
| 2002/0167657 | A1 | 11/2002 | Tomasz |
| 2006/0256320 | A1* | 11/2006 | Peterson ...................... 356/121 |

OTHER PUBLICATIONS

Philips Semiconductors, SJA1000 Stand-alone CAN controller, Jan. 4, 2000.

Steve Corrigan (Texas Instruments), Introduction to the Controller Area Network (CAN), Application Report SLOA101, Aug. 2002.

Modbus-IDA, Modbus Application Protocol Specification V1.1b, Dec. 28, 2006.

Modbus-IDA, Modbus Messaging on TCP/IP Implementation Guide V1.0b, Oct. 24, 2006.

Adroit Engineering, Inc., "Headlamp Aim Comparative Audit System Application Notes," Jan. 17, 2001.

Zytek Communications Corporation, "Headlight Aim Comparative Audit System," http://www.zytek.com/~melvin/adroit.html, May 12, 2002.

Lones, J., and Peterson, K., "Practical Measure of Headlamp Beam Alignment in Vehicle Assembly," Current Developments in Lens Design and Optical Engineering VII, Proceedings of the SPIE, vol. 6288, Aug. 14, 2006, San Diego.

* cited by examiner

HEADLAMP AIM DETECTION WITH SENSORS INDEPENDENT FROM HOST CONTROL UNIT

CROSS REFERENCE TO RELATED APPLICATIONS

This is a continuation of U.S. patent application Ser. No. 12/355,779, filed on Jan. 17, 2009, now U.S. Pat. No. 7,876,427, issued on Jan. 25, 2011.

FIELD OF THE INVENTION

The present invention relates to systems and methods of industrial monitoring and quality control, and more specifically to systems and methods for detecting the alignment of vehicle headlamps.

BACKGROUND

There are a number of methods currently in use to detect the alignment of vehicle headlamps. Traditionally, a vehicle was positioned on a level surface a certain distance (e.g. 25 feet) from a flat, white wall. The pattern of the beams was observed by a human observer, who would then determine the top edge of each beam. The location of the top edge of the beam is typically specified in terms of the height above the ground and is measured along a certain vertical line specified in terms of an angle left or right of the center of the lamp.

FIG. 1 illustrates a vehicle headlamp alignment setup. Vehicle 10 is positioned a specified distance from wall 11. Headlamps 18 and 19 are activated and beams 16 and 17 illuminate wall 11. The top edge of each beam is generally measured at a prescribed position along wall 11. FIG. 1 illustrates four measurement points 12, 13, 14 and 15. Any given vehicle utilizes only two such positions, but which two depends on the particular headlamp. In certain cases the vertical locations are defined to be 2.0 degrees to the left (known as VOL) or 2.0 degrees to the right (known as VOR) of the centerline of the headlamp. In FIG. 1, locations 12 and 14 are the VOL positions and locations 13 and 15 and the VOR positions. Whether or not a headlamp is a VOL type or a VOR type depends on the headlamp manufacturer and how the headlamp has been designed to be audited. Both types of headlamps are in common use today.

Other than traditional manual observation of headlamp illumination, there are other systems in use today that rely on video cameras to observe the illumination pattern. Some of these systems attempt to locate the brightest point, or "hot-spot," of the beam and then determine the top edge of the beam based on a horizontal and vertical offset from the hot-spot. Unfortunately the top edge of the beam is not always positioned the same with respect to the hot-spot as beam illumination patterns vary. Additionally, any time both headlamps simultaneously illuminate a flat surface, the light from one headlamp mixes with the light from the other headlamp, complicating the measurement.

Another system is use today is illustrated in FIG. 2, which is a system built and sold by Adroit Engineering, Inc. Two sensor units 20 and 22 are mounted on a wall and controlled by control unit 25. The system of FIG. 2 detects beam illumination and reports the top of each beam on the front panel using LED readouts and a LED vertical bar display. Sensor units 20 and 22 are not intelligent, independent sensor units; they are directly controlled by control unit 25 via point to point cables. The system is limited to two sensor units and is not networked to any other system, which requires that the audit data be manually recorded.

BRIEF SUMMARY OF THE INVENTION

Headlamp alignment is detected using a collection of intelligent, independent sensor units, each of which incorporates a vertical array of sensing elements capable of detecting headlamp illumination. The sensor units are networked together and can be coupled to a host controller. The host controller can provide a user interface via a touch screen and a Web server, and can further communicate with a plant network for interfacing with manufacturing databases. The network of sensor units can accommodate four or more sensors, which allows multiple vehicles and multiple headlamp types to be audited without physical movement of the sensor units. The sensor units are low in power consumption and can receive power over the same cable providing network communication. Incorporation of non-volatile memory within the sensor units allows factory configuration data to be recorded within each sensor unit and permits convenient replacement of units in the field.

DETAILED DESCRIPTION

Figure 1:
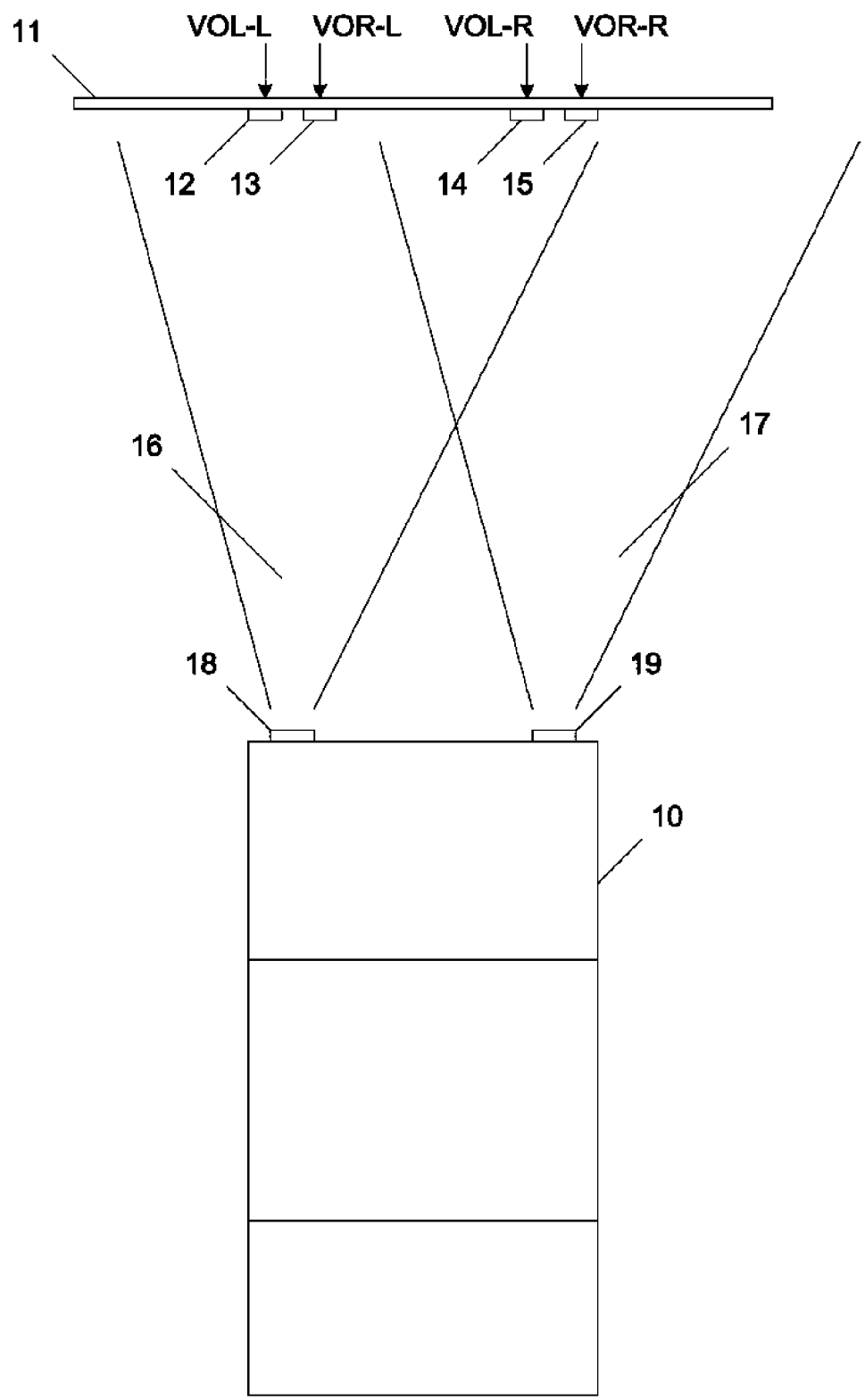
FIG. 1 illustrates a vehicle headlamp alignment setup.
Figure 2:
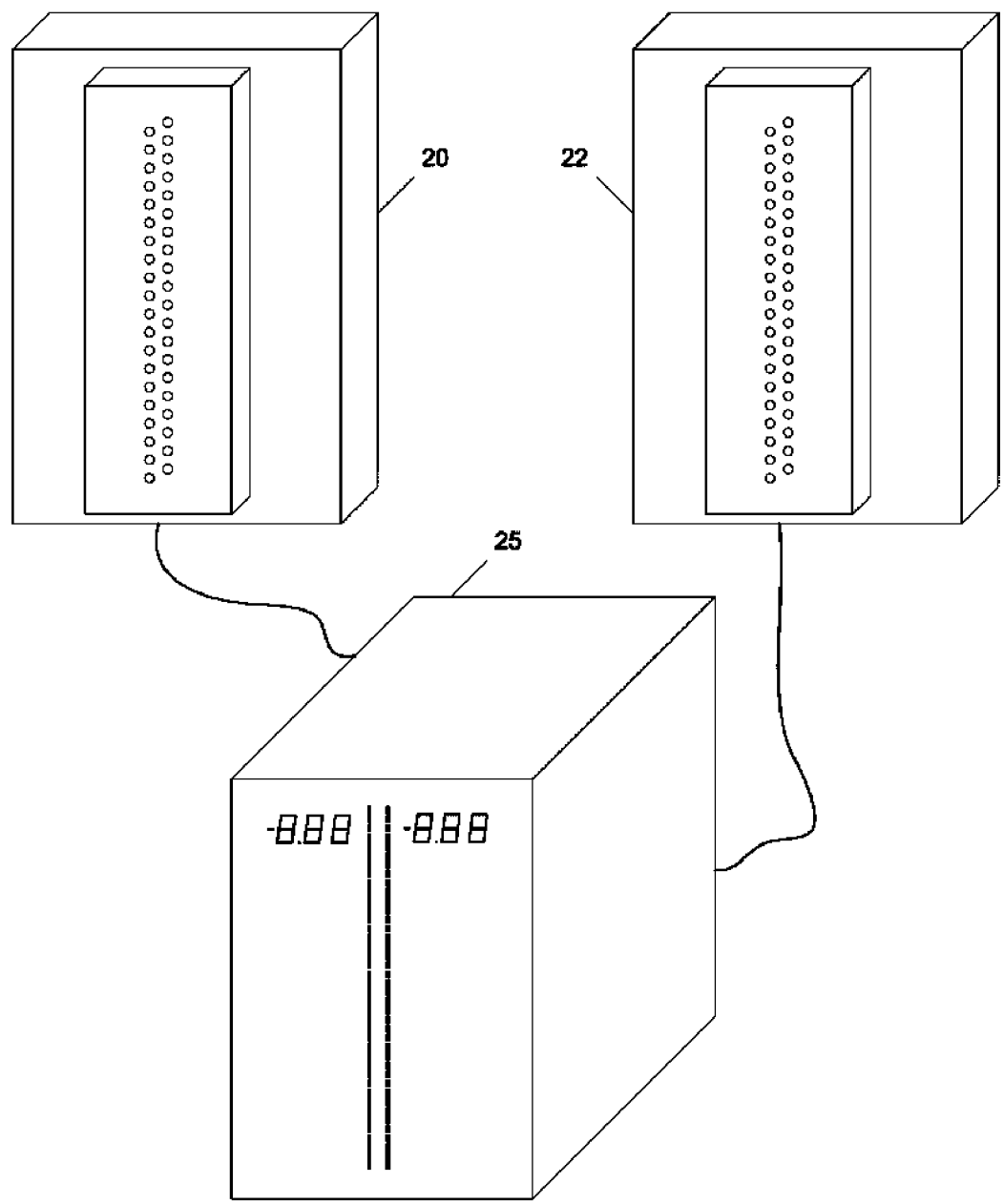
FIG. 2 illustrates a prior art headlamp audit system.
Figure 3:
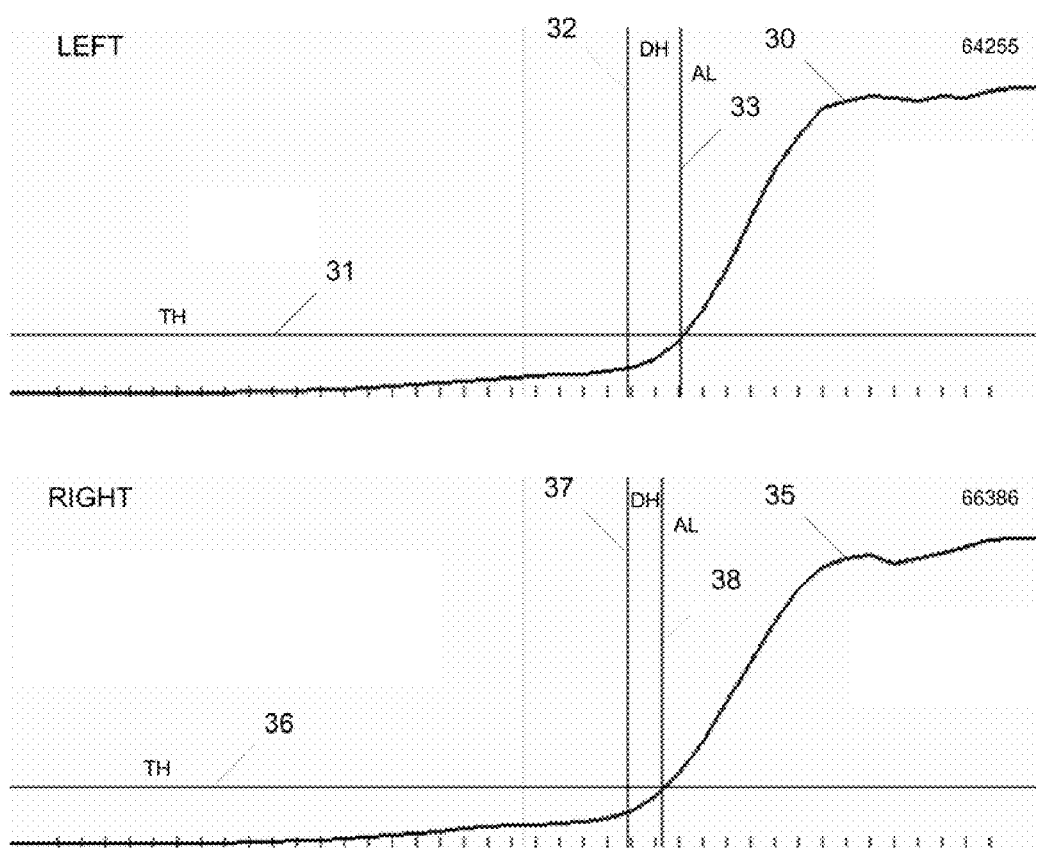
FIG. 3 illustrates a plot of illumination for left and right headlamps.

Referring back to FIG. 1, audit locations 12, 13 14 and 15 are equipped with sensor units in a preferred embodiment of the invention. Each sensor unit incorporates a vertical array of light sensors, and the illumination pattern along the vertical array is analyzed to determine the top edge of the headlamp beam. Sample data retrieved from an embodiment of the present invention is illustrated in FIG. 3. Curve 30 represents illumination level for the left headlamp (at location 12 or 13) and curve 35 represent illumination level for the right headlamp (at location 14 or 15). The horizontal axis is the vertical distance along the sensor, with the top of the sensor at the left and the bottom of the sensor at the right.

Vertical lines 32 and 37 represent the "design height" of the vehicle being audited. The design height is the height at which the top of the beam should ideally be located. It is the target position of the top edge of the headlamp beam, and is unique to each vehicle type. Horizontal lines 31 and 36 represent the illumination thresholds for the headlamp beams. The illumination threshold defines the point at which the edge of the headlamp beam is defined. The intersection of the illumination threshold 31 and 36 with the illumination curve 30 and 35 defines the audit location of each headlamp beam. The vertical lines 33 and 38 represent these audit locations. The distance between the design height and the audit location defines the vehicle audit. In the example illustrated in FIG. 3, the left audit was −1.1 inches and the right audit was −0.7 inches, meaning that the headlamps were aimed slightly lower than the target position. The small tick marks at the bottom of each graph in FIG. 3 mark the actual sensing element location and they are spaced 0.5 inches apart in a preferred embodiment of the invention.

In the example illustrated in FIG. 3, the design heights 32 and 37 and the illumination thresholds 31 and 36 are specific to a vehicle and headlamp type. They are configuration variables that are looked up based on the specific vehicle and headlamp type being audited. The curves 30 and 35 represent dynamic data that is continually being gathered from the sensor units. The audit locations 33 and 38 are an ultimate goal of the audit system, they are computed based on the design height, threshold and curve and are dynamically updated for each illumination curve 30 and 35.

Different headlamp technologies have different illumination properties. For example, halogen headlamps affect the sensing elements differently than high intensity discharge (HID) headlamps. LED based headlamps have even different properties. These differences are based on the sensitivity of the sensing element according to wavelength in comparison to the sensitivity of the human eye according to wavelength. Because a goal of the audit system is to measure illumination as perceived by a human observer, it is important to adjust the measurement criteria based on the lamp technology in use. In a preferred embodiment, when a vehicle is being audited, the type of headlamp (e.g. halogen, HID, or LED) is known by the system and an appropriate illumination threshold is applied. The headlamp type can be known by looking up such information using a VIN number and querying a manufacturing database, it can be manually input by the operator, or it can be automatically recognized based on the illumination curve itself. The use of an illumination threshold is one way to locate the audit location. In alternative embodiments, the slope of the illumination curve is analyzed to determine the audit location. For example, it can be seen from FIG. 3, that the audit locations 33 and 38 are located approximately at the knee of the illumination curves 30 and 35. This position of the curve is located automatically in alternative embodiments and the edge of the beam is specified in terms of an offset from the knee of the curve rather than a threshold value.

Figure 4:
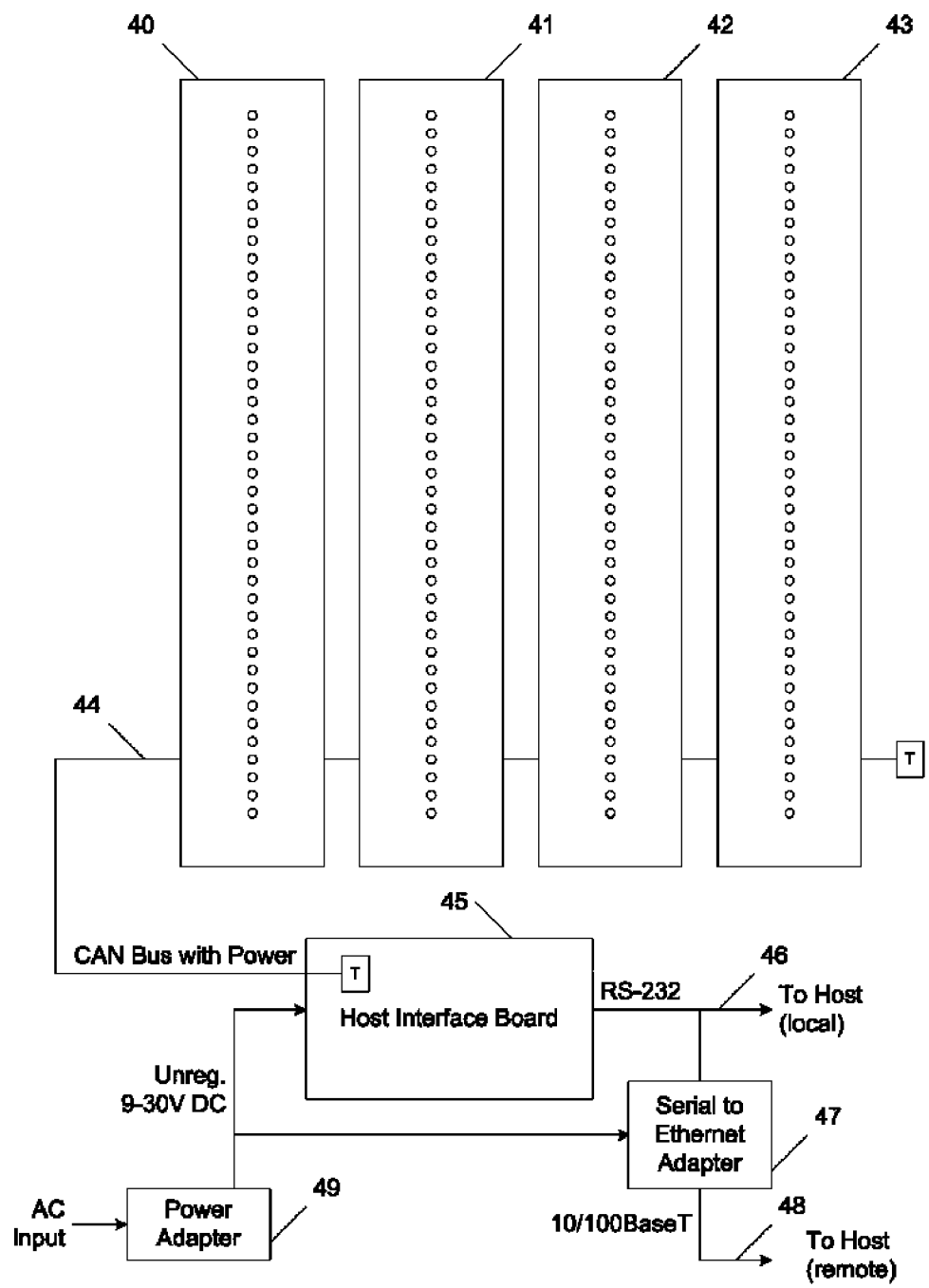
FIG. 4 illustrates a network of sensor units in an embodiment of the invention.

FIG. 4 illustrates a network of sensor units in an embodiment of the invention. Sensor units 40, 41, 42 and 43 are intelligent, independent sensor units which are more fully described below. Each sensor unit 40, 41, 42 and 43 preferably incorporate a linear array of sensing elements, e.g. photodiodes, which are oriented vertically for measurement of headlamp beam illumination. In a preferred embodiment each sensor unit 40, 41, 42 and 43 incorporates 40 photodiodes spaced 0.5 inches apart, but either or more or less sensing elements is possible spaced either closer or further apart. In a preferred embodiment, hardware and software processing of data detected from the sensors spaced 0.5 inches apart can accurately and repeatedly locate the edge of a headlamp beam to within 0.05 inches. Thus the beam edge can be located to less than one tenth of the actual sensor spacing. This "sub-sensor resolution" is accomplished by a combination of high resolution analog to digital conversion of the sensors, time-domain smoothing and space-domain smoothing as is described in detail below.

Sensor units 40, 41, 42 and 43 are networked via a Controller Area Network (CAN) 44. CAN is an industry standard broadcast serial bus capable of passing messages between nodes. The CAN protocol imposes a low overhead in time and power consumption for attached nodes and CAN controllers are commonly available as individual chips or integrated into microcontrollers. In a preferred embodiment, each sensor unit 40, 41, 42 and 43 is wired in a daisy-chain arrangement using standard 8-wire unshielded twisted pair (UTP) cables with RJ-45 connectors and jacks. The CAN-Bus utilizes two of the eight wires, while unregulated DC power is supplied on other wires. Preferably 10-12 volts is supplied which is then regulated within each sensor unit. The sensor units are preferably designed to consume less than 1 watt of power each. The CAN-Bus is terminated at each end with termination resistors as specified in the CAN standard. In a preferred embodiment the CAN network operates at 128 Kbps, which can accommodate very long cable lengths according to the standard, but other network speeds are possible.

FIG. 4 illustrates an embodiment that includes a host interface board 45 at the host end of the CAN network. The host interface board 45 forms an interface between the sensor network and a host, and contains a serial RS-232 port 46 for that purpose. In the example shown in FIG. 4, a host can either be coupled directly to the RS-232 port 46, in the case of a local host controller, or an RS-232 to Ethernet adapter 47 can be used to couple to a remote host over a 10/100 Base T port 48. A power adapter 49 can be used to power the sensor units 40, 41, 42 and 43, the host interface board 45 and the optional serial to Ethernet adapter 47. In alternative configurations, six or more sensor units are networked together, allowing a variety of vehicles with differing headlamp spacing to be accommodated.

Figure 5:
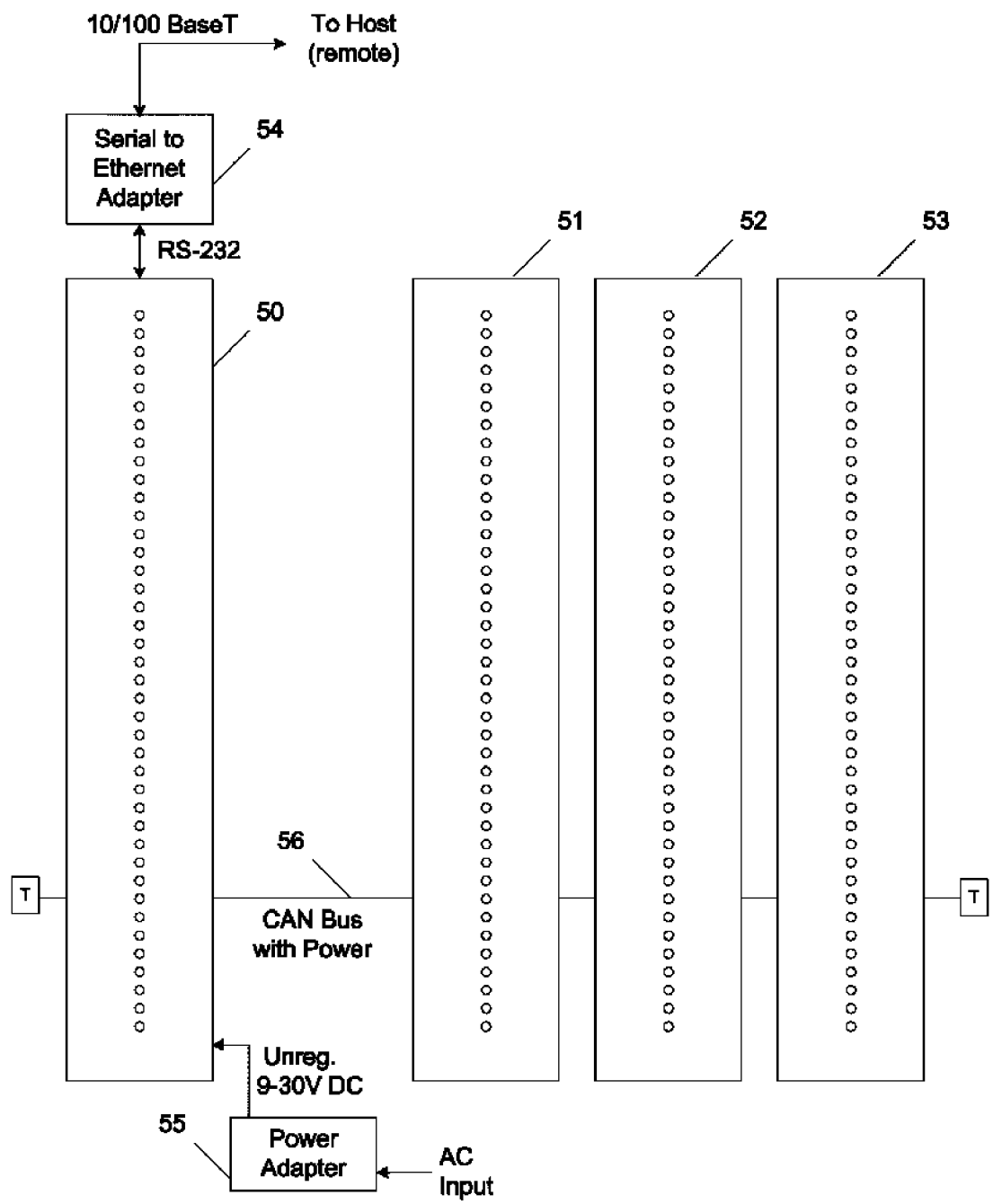
FIG. 5 illustrates a network of sensor units in an alternative embodiment of the invention.

FIG. 5 illustrates a network of sensor units in an alternative embodiment of the invention. In the system illustrated in FIG. 5, sensor units 50, 51, 52 and 53 are coupled together via CAN network 56. Rather than using a host interface board and a local host controller, the system of FIG. 5 is a "headless" system in which one of the sensor units 50 is designated as a master sensor unit, and a serial port local to that sensor unit is used to interface to a serial to Ethernet adapter 54 which then connects to a remote host over a 10/100 Base T interface. A power adapter 55 is used to supply power to all of the sensor units 50, 51, 52 and 53 through master sensor unit 50.

Figure 6:
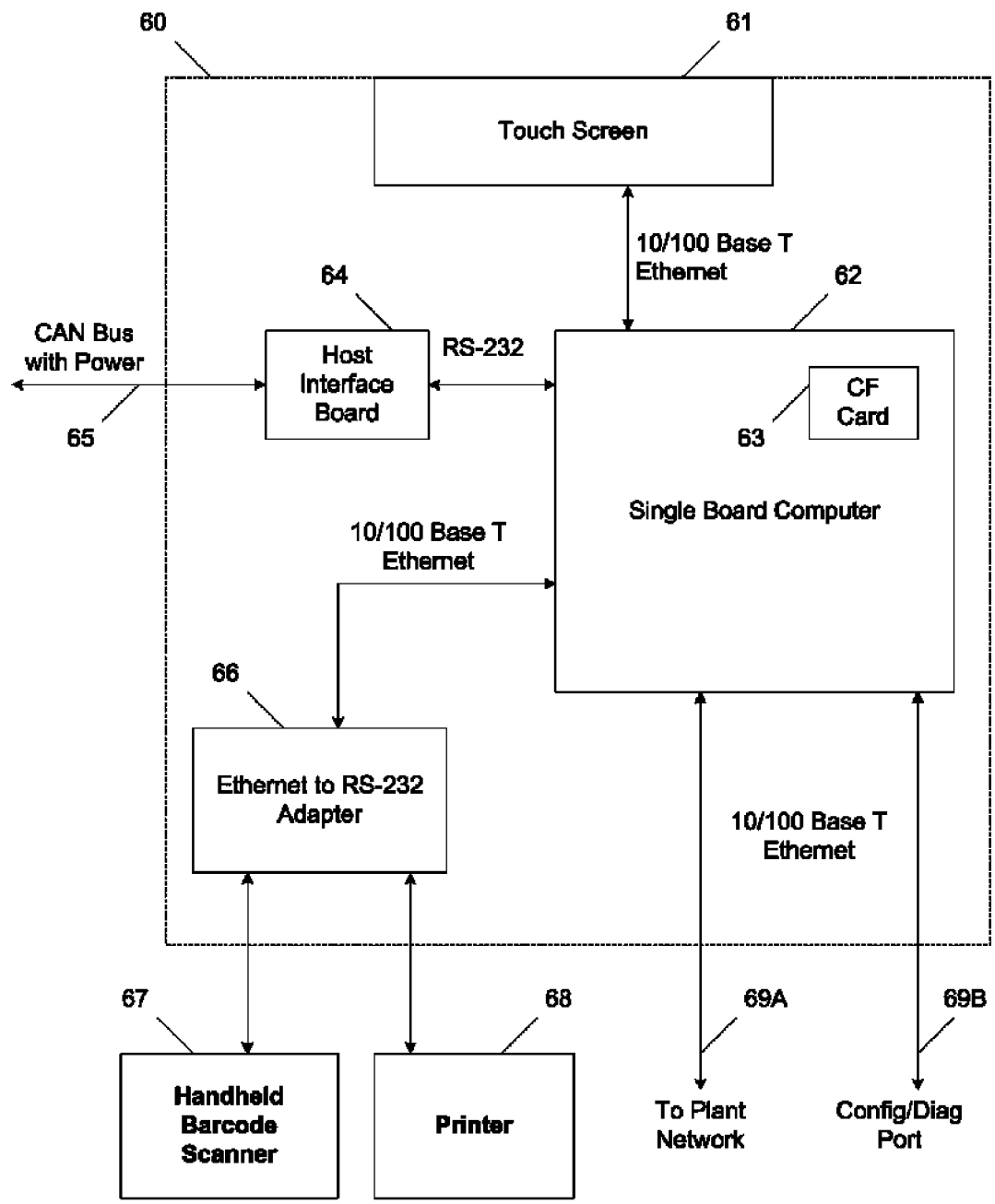
FIG. 6 illustrates the design of a host controller unit in a preferred embodiment.

FIG. 6 illustrates the design of a host controller unit in a preferred embodiment. Enclosure 60 is an industrial enclosure that incorporates touch screen 61 visible and accessible through the front panel. Touch screen 61 is coupled to single board computer 62 through an Ethernet cable internal to the enclosure. In one embodiment the touch screen is a model HMI5056T manufactured by Maple Systems, Inc., which is a 6" color touch screen with an on-board microprocessor and internal non-volatile memory for storing screen displays and configuration data. Single board computer 62 incorporates a flash CF card that contains a Unix operating system, control software, configuration data and logged information. In one embodiment single board computer 62 is a model net5501 manufactured by Soekris Engineering, Inc., which is a compact, low-power, single board computer based on a 586 class microprocessor and has four 10/100 Mbit Ethernet ports. In one embodiment flash CF card 63 contains FreeBSD version 6.3-RELEASE, which is an open source Unix operating system publically available at www.freebsd.org.

Enclosure 60 also contains a host interface board 64, which interfaces to multiple sensor units over a CAN network such as board 45 discussed above in connection with FIG. 4. Host interface board 64 is coupled to single board computer 62 over a serial RS-232 port. Enclosure 60 also contains a dual-port Ethernet to RS-232 adapter, which is used to couple single board computer 62 with two external RS-232 devices, portable hand barcode scanner 67 and printer 68. Scanner 67 is used to scan bar codes that are associated with vehicles being audited. In one embodiment the Vehicle Identification Number (VIN) of a vehicle at an audit station is encoded into a printed bar code. The printed bar code is scanned using scanner 67, which allows the VIN number to be received by software running on single board computer 62. In one embodiment, the VIN number is used to identify the vehicle being audited so that the audit unit can adapt that the headlamp type and position and can retrieve configuration information specific to that vehicle type. The manner in which the VIN number is used to retrieve the data is explained in detail below. Printer 68 is used to print audit information if desired.

The host control unit illustrated in FIG. 6 also contains two 10/100 Base T Ethernet ports 69A and 69B. Port 69A is coupled to a plant network. The connection to a plant network is used so that the host control unit can retrieve vehicle information and can communicate the results of the audit to a manufacturer database system if desired. The plant network connection 69A can also be used for remote monitoring, configuration and/or control of the host control unit. Port 69B can be used for local configuration and/or diagnostics. For example a laptop computer can be connected to port 69B for monitoring, configuration and control of the host control unit. In alternative embodiments, port 69B can be coupled to a second network, such as a secondary plant network or a wide area network. The use of two independent network ports 69A and 69B allows single board computer 62 to apply different rules and access policies to access over each network. In a typical configuration, port 69A is used only for access to manufacturing database systems and port 69B is used only for access to a Web server running on single board computer 62, although these functions can be combined or mixed across network ports in alternative embodiments.

Figure 7:
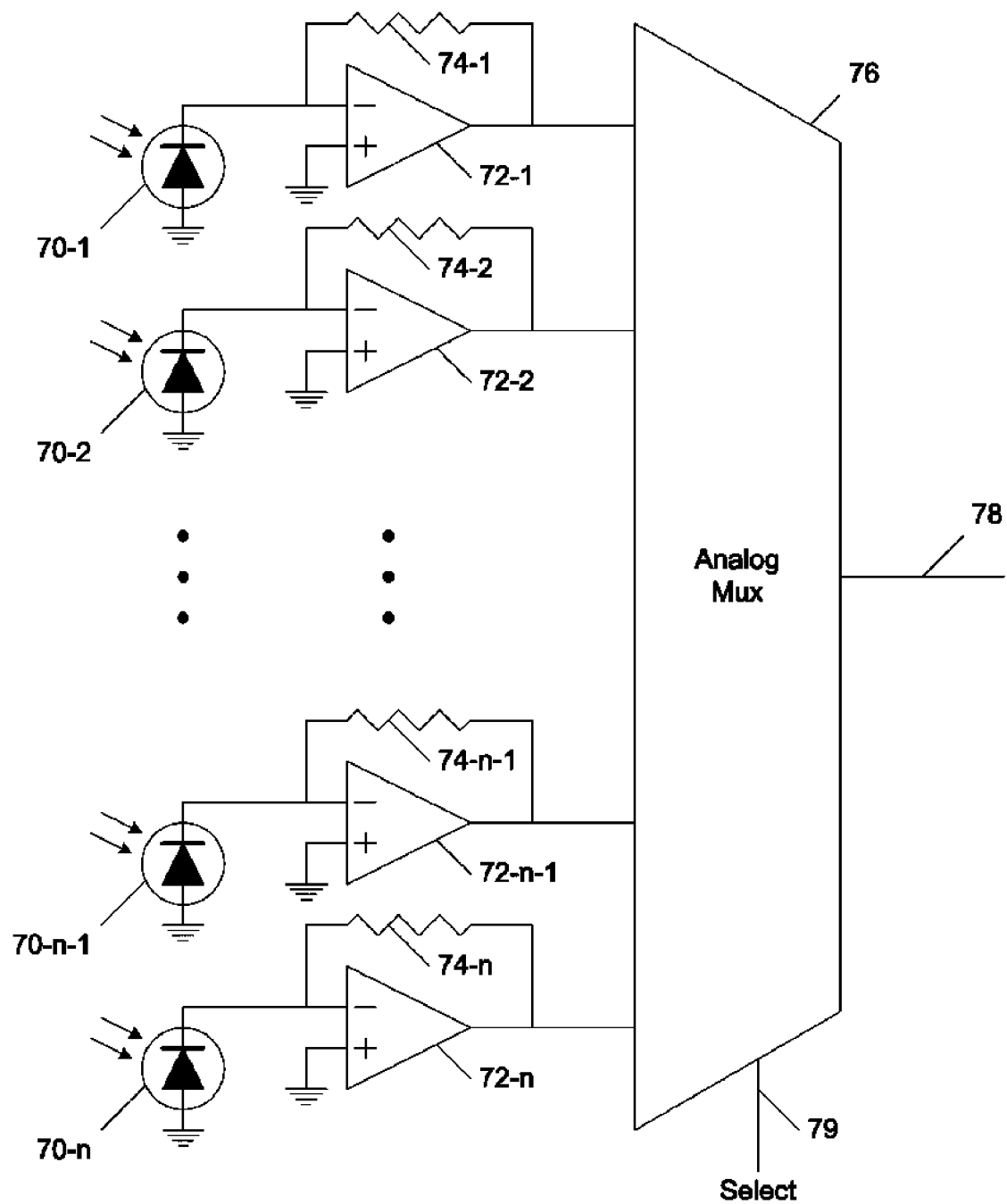
FIG. 7 illustrates photodiodes and associated circuitry in an embodiment of the invention.

Sensor units 40, 41, 42, 43, 50, 51, 52 and 53 preferably include a dedicated microcontroller responsible for network communication as well as sequencing and processing of integrated analog to digital converter coupled to an array of photodiodes. FIG. 7 illustrates the photodiode array and associated circuitry in a preferred embodiment.

An array of photodiodes 70-1, 70-2, . . . 70-$n$-1, 70-$n$ are coupled to respective operational amplifiers (op-amps) 72-1, 72-2, . . . 72-$n$-1 and 72-$n$. In a preferred embodiment there are 40 photodiodes and op-amps, but more or less than 40 can be provided. Feedback resistors 74-1, 74-2, . . . 74-$n$-1 and 74-$n$ provide gain to amplify the signal from the photodiodes. The photodiodes in FIG. 7 are in what is known as the "photoconductive mode," and the amount of light falling on each photodiode is proportional to current flowing through the diode to ground. The op-amp will maintain a positive voltage at its output sufficient to cause current to pass through the feedback resistor and match the currently flowing through the photodiode. Op-amps 72-1, 72-2, . . . 72-$n$-1 and 72-$n$ are supplied with positive and negative supply voltages. In a preferred embodiment, filter capacitors (not shown) are connected in parallel to feedback resistors 74-1, 74-2, . . . 74-$n$-1 and 74-$n$ to implement low pass filtering.

Analog multiplexer 76 is used to select the output from one of the op-amps and transfer the voltage level to output 78, which is then used as the input to an analog to digital converter. The selection input 79 of analog multiplexer 76 and the analog to digital converter are both controlled by an on-board microcontroller as described below. Analog multiplexer 76 may be implemented in multiple stages, such that signals pass through multiple devices. Alternatively, analog multiplexer 76 may consist of multiple single stages such that output 78 consists of multiple individual signals. For example, in a preferred embodiment, 40 photodiodes are coupled to 40 op-amps which are then coupled to two 16-1 analog multiplexers and one 8-1 analog multiplexer. The resulting three analog outputs are coupled to separate input pins of a microcontroller. The final stage of selecting which of the three analog inputs are coupled to the on-chip analog to digital converter is accomplished within the microcontroller.

Figure 8:
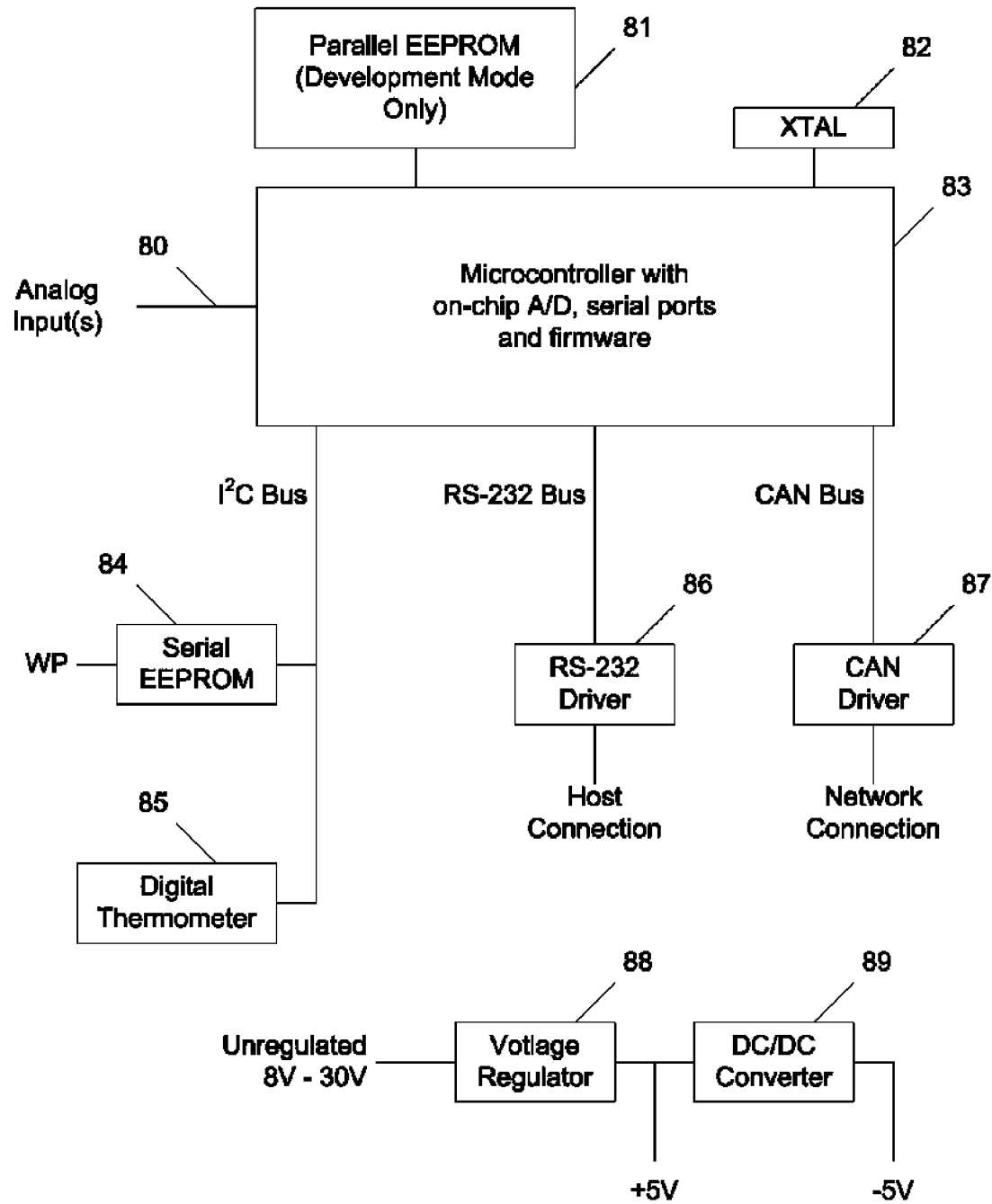
FIG. 8 illustrates a microcontroller and associated circuitry in a preferred embodiment.

FIG. 8 illustrates a microcontroller and associated circuitry in a preferred embodiment. Microcontroller 83 receives one or more analog signals 80 from analog multiplexer 78. Microcontroller 83 preferably incorporates on-board analog to digital conversion circuitry as well as interface circuitry for three separate serial interfaces. An I$^2$C serial interface is used to connect to serial EEPROM 84 and digital thermometer 85, which are incorporated on the same printed circuit board as microcontroller 83. The second serial interface is an asynchronous serial port that can be coupled to an RS-232 driver for connection to a host. The third serial interface is a CAN Bus network port that is coupled to CAN transceiver 87 which is coupled to a CAN network. Microcontroller 83 is coupled to external crystal 82 and can be coupled to parallel EEPROM 81 through a latch (not shown), which is used only in a development mode. During development, an external parallel EEPROM (e.g. a 27C256) is used to test firmware during development. Such an external EEPROM can be reprogrammed by removing it from a socket and reprogramming in on a device programmer. Alternatively, an external parallel EEPROM can be reprogrammed without removing it from the board by remote downloading.

For production units, microcontroller 83 preferably incorporates firmware on-chip that can be programmed before installation, eliminating the need for external program memory and protecting the firmware from reverse engineering. Certain microcontroller devices incorporate one-time programmable (OTP) firmware which can be written to each chip individually, but cannot be erased. The sensor units also preferably incorporate voltage regulator 88 for generating voltages for on-board devices as well as DC/DC converter 89 to be used for the op-amps illustrated in FIG. 7.

In a preferred embodiment microcontroller 83 is model P87C591 manufactured by Philips Semiconductors (now NXP Semiconductors). The data sheet for the P87C591 illustrates the device characteristics and configuration of the microcontroller and is hereby incorporated by reference. In one embodiment, sensor units that do not have host connections, such as 40, 41, 42, 43, 51, 52 and 53 do not utilize RS-232 driver 86 and this port is not needed. In alternative embodiments a microcontroller could be used without a host interface port within such devices. Other network interfaces besides a CAN network could also be utilized in alternative embodiments.

Host interface boards 45 and 64 preferably incorporate most of the circuitry shown in FIG. 8 and none of the circuitry shown in FIG. 7. Host interface boards do not need DC/DC converter 89 and do not utilize analog inputs 80, but otherwise they share the same system architecture as sensor units 40, 41, 42, 43, 50, 51, 52 and 53. The use of a single system architecture allows the same firmware to be used in slave mode sensors (40, 41, 42, 43, 51, 52, 53), master mode sensors (50) and host interface boards (45, 64). Each board can utilize information stored on serial EEPROM 84 to determine whether it is a host interface board or a sensor board and whether it is a master or slave.

In one embodiment crystal 82 is a 6.144 MHz crystal. This frequency translates to an internal machine cycle of 977 nanoseconds on the P87C591. Although the P87C591 is capable of being operated as fast as 16 Mhz, power consumption increases with faster operation, and a machine cycle of 977 nanoseconds is sufficient to accomplish the tasks necessary on the sensor unit. As such power consumption is minimized while maintaining flexibility. The frequency of 6.144 Mhz is also convenient for the operation of the serial port, allowing the generation of standard baud rates of 38.4 Kbps and 76.8 Kbps. The details of baud rate generation on the serial port of the P87C591 can be found in the data sheet.

Figure 9:
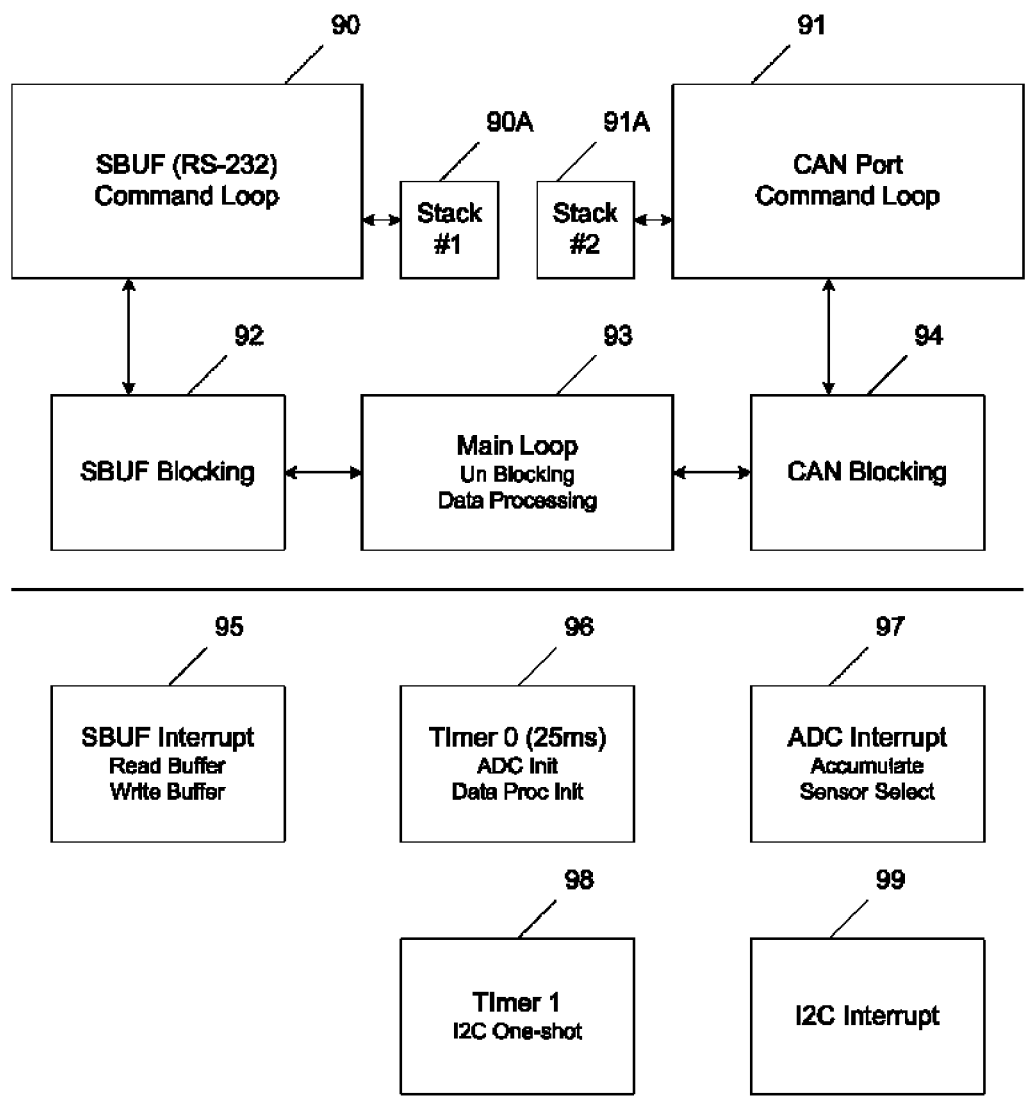
FIG. 9 illustrates the firmware architecture for the sensor units in an embodiment of the invention.

FIG. 9 illustrates the firmware architecture of the sensor units 40, 41, 42, 43, 50, 51, 52 and 53 and host interface boards 45 and 64. Each block illustrated in FIG. 9 represents a set of microcontroller instructions and/or registers or memory locations located in microcontroller 83. Two command loops, the SBUF Command Loop 90 and the CAN Port Command Loop 91 continuously wait for input from the RS-232 port or the CAN port respectively and process any commands that are received. The SBUF Command Loop 90 utilizes a stack 90A for local data and subroutine return addresses. CAN Port Command Loop 91 has a separate stack 91A that is utilized for local data and subroutine return addresses. When the SBUF Command Loop is waiting for an event, it enters SBUF Blocking code 92, which blocks the execution until the event on which the code is waiting occurs. The SBUF Command Loop 90 can be waiting for: 1. the SBUF read buffer to become non-empty (i.e. waiting for a character to be received, this is the typical condition when no commands are being processed); 2. the SBUF write buffer to become not-full; 3. an I2C command to be completed (e.g. a read or write to the serial EEPROM); or 4. the CAN transmit buffer to become available (this is used in master mode when commands are relayed from the host port to the network port). When SBUF Blocking code 92 is invoked, information is saved regarding the event being waited on and the Main Loop 93 is entered. When the CAN Port Command Loop 91 is waiting for an event, it enters CAN Blocking code 94, which blocks the execution until the event on which the code is waiting occurs. The CAN Port Command Loop 91 can be waiting for: 1. the CAN read port to become available (i.e. a network message has been received that passes the configured filters, this is the typical condition when no network messages are being processed); 2. the CAN transmit buffer to become available; 3. an I2C command to be completed (e.g. a read or write to the serial EEPROM); or 4. the SBUF write buffer to become not-full (this is used in master mode when commands are relayed from the network port to the host port).

Main Loop 93 is responsible for polling the blocking conditions to determine if either of the SBUF Command Loop or the CAN Command Loop can be unblocked. The Main Loop 93 is also responsible for performing data processing functions. Data processing is initiated every 250 ms in one embodiment of the invention and involves applying a smoothing filter to the accumulated sensor data. Everything below the horizontal line in FIG. 9 is an interrupt routine that is invoked by a timer or a hardware interrupt and can interrupt any routine above the horizontal line. SBUF Interrupt handler 95 is invoked whenever a character is received on the serial port or when a character has been transmitted over the serial port. This code manages an SBUF read buffer and an SBUF write buffer and sets full and empty flags that are tested by the Main Loop 93.

Timer 0 code 96 is the main timer interrupt that is programmed to occur every 25 ms in one embodiment. This code is responsible for initiating the analog to digital conversion cycle, in which all sensors are sampled. Timer 0 code 96 also maintains a 250 ms timer and sets a flag to initiate data processing every 250 ms. When data processing is triggered, the Timer 0 code 96 first copies accumulated sensor data to "snapshot" locations, which remain stable during the data processing process and allows the sensor data to continue accumulation during data processing. Timer 1 code 98 is used as a one-shot to support the I2C port. This code is used to implement a timeout for writes to the serial EEPROM. ADC Interrupt code 97 is invoked when each analog to digital conversion takes place. This code is responsible for reading the digital data from the analog to digital converter and then accumulating this data according to the sensor being sampled. The ADC Interrupt code 97 also updates the sensor selection signals, which control the internal and external analog multiplexers and then initiates another analog to digital conversion.

The analog to digital converter in the P87C5891 takes approximately 50 machine cycles, which in an embodiment utilizing a 6.144 Mhz crystal constitutes approximately 49 microseconds. The processing of the ADC Interrupt code 97 for handling one sensor takes on the order of 90 microseconds. This accounts for data accumulation, analog multiplexor (internal and external) selection and interrupt overhead. There are 41 samples (40 sensors plus a measurement of the unregulated voltage input). One complete cycle therefore takes about 5.7 milliseconds and the cycle is repeated every 25 milliseconds. The ADC Interrupt code therefore constitutes a relatively small portion of the overall CPU overhead of the microcontroller.

The accumulation that occurs in the ADC Interrupt code 97 is a time-domain smoothing of the analog samples used to increase the resolution of the input and to filter out noise in the sampling. An algorithm is used that implements what is known as "exponential decay." A quantity that undergoes exponential decay decreases at a rate that is proportional to its value. The advantage of an exponential decay mechanism is that it allows time-domain smoothing to be implemented without the requirement of storing historical data, only the last accumulated value is stored. More specifically, the ADC Interrupt code 97 implement the function: NEW=(OLD*F)+ INPUT, where OLD is the previously accumulated data, INPUT is the newly sampled sensor data and F is a constant less then one. Preferably F is between 0.95 and 0.98. Note that the maximum value for NEW can be computed as 1/(1−F) times INPUT. Thus, for F=0.95, the maximum value is 20 times the INPUT value. This means that the register storing the computed value of NEW must be wide enough to accommodate enough bits to prevent overflow. Alternatively, the value of INPUT can be pre-shifted to the right before the accumulation with the value of (OLD*F). In a preferred embodiment, ADC Interrupt code 97 maintains 16-bit values for each sensor input. The analog to digital converter on the P87C591 generates 10-bits of digital data on each sample.

The I2C Interrupt code 99 processes the command and control mechanism for the I2C bus. The I2C bus is used to connect a serial EEPROM and a digital thermometer to the microcontroller, and the I2C Interrupt code 99 handles read and write processing. The serial EEPROM is used to store configuration data as well as an equalization array. The equalization array is a set of 40 16-bit numbers which are applied to each sensor as a form of calibration. The table below shows the layout of the serial EEPROM in one embodiment.

| Serial EEPROM Memory Map (128 bytes) | |
| --- | --- |
| 0 | EEPROM Status (magic number) |
| 1 | Mode (2 bits) ' CAN ID (6 bits) |
| 2-3 | Serial Number (16 bits) |
| 4-7 | (reserved) |
| 8-9 | Voltage Calibration (16 bits) |
| 10-47 | (reserved) |
| 48-127 | Photodiode Equalization Array (80 bytes) |

The equalization procedure is used to adjust each sensor according to differences in the sensors, feedback resistors and op-amp characteristics. This is based on a factory procedure in which the sensors are carefully illuminated and differences between them are computed. The result of the factory equalization procedure is the Photodiode Equalization Array, which is then written to the serial EEPROM. During data processing, each 16-bit snapshot sensor value is first multiplied by its respective 16-bit equalization value as an initial adjustment before further processing takes place.

The serial EEPROM may be equipped with a write protect feature. This is a pin on the device which can be grounded in order to enable writes to the EEPROM. In a preferred embodiment, the write protect pin is connected to a jumper which is enabled at the factory only for updating of equalization data. Once the data has been written, the write protect jumper is removed to prevent changes to the serial EEPROM data in the field.

The two mode bits and the CAN ID bits that are stored in offset 1 of the serial EEPROM are used as configuration data. One of the mode bits is the "master mode" bit, which indicates whether the board should operate in master mode or slave mode. The second mode bit is the "sensors present" bit, which is turned on for boards that have sensors installed, and disabled for boards that have no sensors, such as host interface boards. The CAN ID is a 6-bit value that is used identify nodes on the CAN network. In one embodiment, each attached device is required to have a distinct CAN ID programmed into its serial EEPROM. Although the CAN network protocol does not require such an arrangement, it simplifies processing for CAN nodes to be uniquely and statically identified. In alternative embodiments, node identification could take place dynamically where each node could be allocated an ID on power up based on a node discovery algorithm. The advantage of such a mechanism is that sensor nodes would not have to be uniquely configured.

SBUF Command Loop 90 processes command received from a host over the serial port. Normally the serial port is used only in a master mode device. The set of SBUF commands available in one embodiment of the invention is illustrated in the table below.

| Host and NetworkCommands | |
| --- | --- |
| Acknowledge | Return configuration and status information |
| Read Internal RAM | Read 8 bytes of internal memory |
| Read Auxiliary RAM | Read 8 bytes of auxiliary memory |
| Read EEPROM | Read 8 bytes of EEPROM data |
| Read Temperature | Read digital thermometer data |
| Read Parameters | Read 8 byte general purpose data |
| Read Voltage | Read measured voltage |
| Write EEPROM | Write 8 bytes to EEPROM |
| Write Parameters | Write 8 byte general purpose data |

In the master mode, the same set of commands illustrated above have a "remote" version which causes the command to be relayed to the CAN interface. The remote commands received over the SBUF interface have a "node" parameter which is a 6-bit CAN ID used to direct the command to a particular CAN node. A slave device will receive a directed CAN message and then respond to that message, which will be received only by the master CAN device. When a CAN response is received by the master mode device, it is relayed back to the SBUF port.

SBUF character processing uses an encoding of ASCII characters to minimize bandwidth. Each 7-bit ASCII characters is mapped as follows: 0-30, 127 not used, 31-62 commands and responses, 63-126 data. This mapping is implemented by incrementing a received byte and then decoding bits 5, 6 and 7. A transmitted byte is prepared and then decremented before transmission. The six bits of data available per character are utilized such that two bytes of data (16-bits) are encoded into three ASCII characters (which can contain up to 18-bits of information). Thus, 8 bytes of information utilized 12 ASCII characters. CRC protection is used on all SBUF command strings. A single CRC character with a 6-bit CRC is appended to any transmitted command or response. Also, because of the difference between data and command encodings, an abort will take place if a command byte is received while expecting a data byte and vice versa. This will minimize the amount of lost data and the time spent re-synchronizing when there are lost characters. The CAN network also implements CRC protection for CAN messages. This feature is embedded into the CAN controller and need not be handled by microcontroller firmware.

CAN commands use the 11-bit message format defined by the CAN protocol in one embodiment. In alternative embodiments, the 29-bit message format could be used to allow additional information to be returned along with the maximum data size of eight bytes per message. In one embodiment, the CAN bus is structured in a master slave arrangement where most commands are directed at a single destination. The 6-bit CAN ID from the EEPROM is used as a unique identifier. The 11-bit message IDs are encoded as a 6-bit CAN ID and a 5-bit command. The RTR bit is not used. The CAN ID of 0 is reserved and will cause all nodes to respond. This can be used with the acknowledge command for node discovery. A sensor in slave mode responds only to message IDs containing their CAN ID in the upper 6 bits and to a message IDs containing a CAN ID of 0. This filtering is set up in the filter registers within the CAN controller. A sensor or interface board in master mode will receive all messages.

The data processing code that is implemented by Main Loop 93 and takes place every 250 ms applies a filter across adjacent samples. The filter is implemented as a sliding window where the illumination value at a particular location is computed based on the multiplication of the sensor at that location with a multiplier, added to neighboring sensor values multiplied by other multipliers. The resulting illumination curve is stored in internal memory and can be retrieved remotely using Read Auxiliary Memory command. Thus, the illumination curve is polled by the host controller through a host interface board and through the CAN network. In one embodiment, the total time between requesting eight bytes of data by a host controller (such as single board computer 62) until receiving the requested data is on the order of 7 milliseconds. This means that the entire illumination curve from one sensor can be read in about 70 milliseconds. Typically only two sensor units need to be actively polled for a given vehicle, meaning that both illumination curves can be retrieved in about 150 milliseconds. In one embodiment, the two active sensor units are polled at a rate of between 250 milliseconds and 500 milliseconds. In alternative embodiments, faster CAN network speeds, faster microcontroller speeds and faster serial port speeds could be used to reduce the data retrieval latency. However, optimizing for power consumption suggests that the speeds should be carefully optimized for maximum efficiency.

In one embodiment the Read Auxiliary Memory command has a "freeze mode" bit which is used during polling by a host to instruct the remote sensor unit not to update its illumination curve in the data processing loop. The host will then set the freeze mode bit while it reads the illumination curve and then clear the freeze mode on the last read command. This mechanism will ensure that a polled illumination curve represents a consistent set of data from a single 250 ms data processing operation.

Single board computer 62 is preferably configured with an open source Unix operating system running of a CF flash memory card. In one embodiment a compact image of FreeBSD 6.3-RELEASE is used which occupies less than 200 MB, which allows a 1 GB CF flash card to easily accommodate the operating system, system software and log data. Preferably the operating system is configured with no swap device and is optimized to minimize writes to the CF card, since writes are typically limited. This increases the reliability of the system by increasing the life of the CF card. One way to avoid unnecessary writes to the CF card is to mount the operating system using the "noatime" flag, which instructs the operating system not to modify the access time of a file whenever it is accessed, which is the default behavior. Another method of reducing unnecessary writes to the CF card is to create a memory based file system using the "mdmfs" command. Using this mechanism temporary files that are small can be read and written without affecting the CF flash card.

Figure 10:
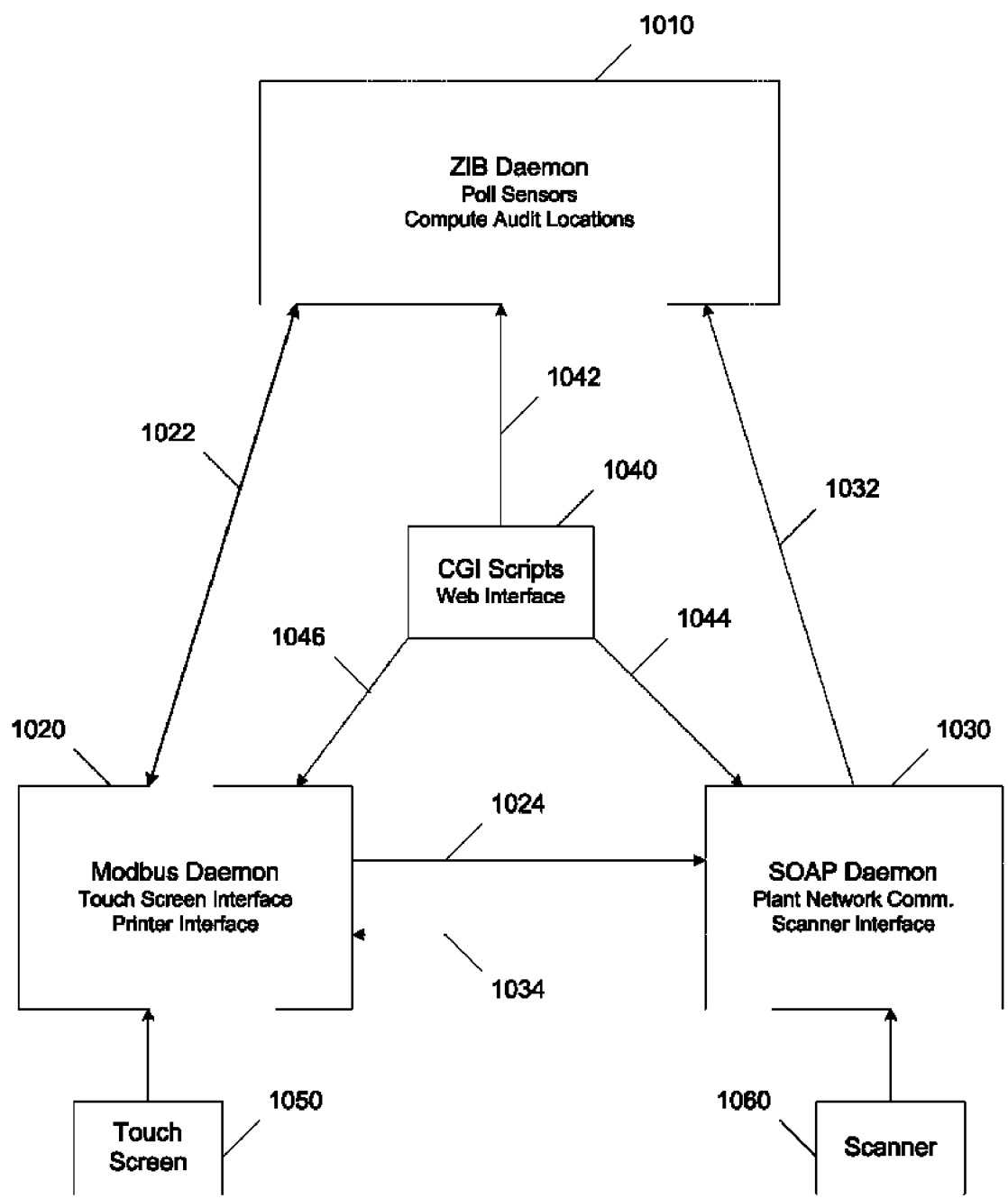
FIG. 10 illustrates software running on a host controller in an embodiment of the invention.

FIG. 10 illustrates control software running on top of the Unix operating system in one embodiment of the invention. The control software is composed of three main "daemons," the ZIB Daemon 1010, the Modbus Daemon 1020 and the SOAP Daemon 1030, as well as a collection of CGI Scripts 1040. A daemon is a program that runs in the background and is typically initiated at boot time. In a preferred embodiment each of the three daemons illustrated in FIG. 10 is a Tcl script which is invoked at startup time and runs continuously as long as the system is operating. Tcl (Tool Command Language) is a scripting language; in alternative embodiments the daemons can be written in C or another programming language, or in another scripting language.

The ZIB Daemon 1010 is responsible for polling the sensor units. ZIB Daemon 1010 reads a configuration file at startup time that lists the CAN IDs of all of the attached sensors and it communicates with those sensors to maintain status information. The ZIB Daemon 1010 also retrieves the illumination curve for a pair of sensors when a vehicle has been selected. Vehicles are selected by loading a "vehicle specification," a collection of which are maintained in an XML formatted file stored on the CF flash card. A vehicle specification specifies which sensor units to use for left and right auditing, the design height of the vehicle and the left and right illumination thresholds. A vehicle specification also may specify how it is defined in terms of components of a VIN number and/or components from a plant database.

The selection of a vehicle can occur through the operation of the Scanner 1060 that scans a VIN number and causes a vehicle to be selected. Communication path 1032 instructs ZIB Daemon to load the audit information for a vehicle that has been selected through operation of Scanner 1060. A vehicle may also be selected through the operation of touch screen 1050. In this case the user is presented with the list of vehicles defined in the XML file and the user may select one. The communication path 1022 is used to communicate the selection of a vehicle from Modbus Daemon 1020 to ZIB Daemon 1010. A vehicle may also be selected through the Web interface. In this case a CGI Script 1040 communicates with ZIB Daemon 1010 which causes it to load audit information for a particular vehicle.

Once the ZIB Daemon 1010 loads the audit sensors, design height and thresholds from the vehicle specification file, it continually polls the specified sensors for their illumination curves and computes the audit location for left and right headlamps. The computation of audit location was described above in connection with FIG. 3. Communication path 1022 in FIG. 10 is used to communicate the real-time audit locations from the ZIB Daemon 1010 to the Modbus Daemon 1020. The Touch Screen 1050 continually polls Modbus Daemon 1020 for audit data when it is in the audit display screen. The polling of data by the Touch Screen 1050 uses the Modbus TCP/IP protocol, which is a standard protocol used by instrumentation systems.

Modbus Daemon 1020 is responsible for interfacing with the Touch Screen 1050 as well as interfacing with the printer. The printer is activated when the user selects the "Print" button on Touch Screen 1050, which causes audit data to be printed on the attached printer. Communication path 1034 is used in the case of a Scanner operation to inform the Modbus Daemon 1020 of a VIN number and the name of a selected vehicle so this information can be displayed to the user via Touch Screen 1050. Communication path 1024 is used by the Modbus Daemon 1020 to inform the SOAP Daemon 1030 that the user has requested an update of a manufacturing database coupled to the plant network.

SOAP Daemon 1030 is used to handle communication with manufacturing databases. In a preferred embodiment there is a "build" database which contains information about each vehicle being built. This database is queried using a scanned VIN number and the configuration the vehicle, including its model and headlamp type can be retrieved. The build database in conjunction with the VIN number is used to select a vehicle specification. The vehicle specification in turn contains the audit information that is needed by the ZIB Daemon 1010 to compute the audit locations. In addition to scanner input of a VIN number, a VIN number can also be provided through the Web interface. In this case a CGI Script 1040 communicates a VIN number through communication path 1044.

SOAP Daemon 1030 also handles communication with a manufacturing database for the purpose of updating audit information. Audited left and right locations can be transmitted to a remote database so that such data can be stored and tracked. Database updates can be triggered trough Touch Panel 1050 or through the Web interface. When an audit is updated, the information may also be logged locally to the CF flash card. This allows retrieval for diagnostic or debugging purposes. Also, it may be desirable to log the entire illumination curve locally, while only the computed audit positions may be updated to the plant database.

The communication paths illustrated in FIG. 10 are implemented using Unix sockets in a preferred embodiment. Each daemon listens for connections on a specified port and when a connection is made will accept commands over that connection. With the exception of communication path 1022, which is persistent, the communication paths do not remain open and are established and then disconnected after the command is executed by the daemon acting as the server. The CGI Scripts, which are not daemons but are programs invoked by the Web server and run only once for a given Web page also use Unix sockets to communicate with the daemons. In a preferred embodiment single board computer is running a version of the Apache web server (not shown), which is an open source Web server standard with FreeBSD. The Apache web server invokes CGI Scripts 1040, which are Tcl scripts in one embodiment. CGI Scripts 1040 could also be written in another scripting language or in a programming language such as C.

In one embodiment the ZIB Daemon 1010, the Modbus Daemon 1020, the SOAP Daemon 1030 and the CGI Scripts 1040 communicate over the Unix sockets using Tcl commands. Since each daemon and the scripts are all based on Tcl, a received Tcl command can merely be executed in the environment of the process acting as the server, relying on the command parsing and execution features built into Tcl. This allows for development of inter-process communication that is robust and is easy to implement and debug. For example when Modbus Daemon 1020 wants to request left and right audit data from ZIB Daemon 1010, it opens a connection and then sends a string in the manner such as the following:

puts $zibd_channel "set retval \"\$audit_left \$audit_right\""

ZIB Daemon 1010, upon opening a connection as a server process accepts strings on that connection. The ZIB Daemon 1010 can then execute code such as the following when the channel becomes readable:

catch {gets $channel line}
catch {eval $line}
puts $channel $retval

It will be appreciated that other error checking code is used to test for and handle abnormal conditions, but these statements illustrate the principle. By passing Tcl commands in this way between Tcl based daemons, a very convenient form of inter-process message passing is achieved without the need to define a new communication protocol and implement message parsing code in each daemon.

Figure 11:
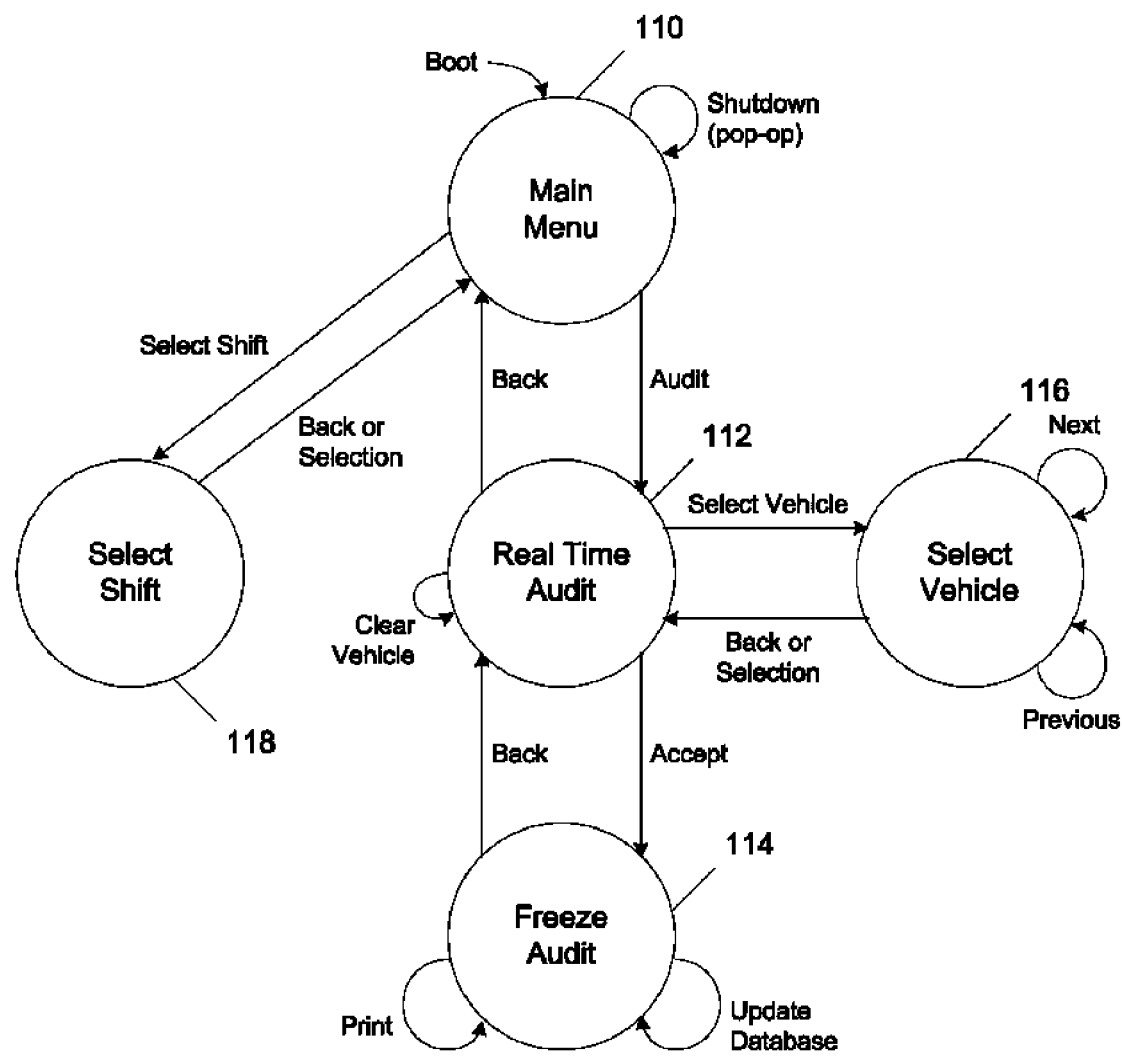
FIG. 11 illustrates a state diagram for the touch screen in an embodiment of the invention.

FIG. 11 illustrates the state diagram for the touch screen in an embodiment of the invention and FIGS. 12, 13, 14 and 15 illustrate the screens associated with the Main Menu, Real-Time Audit, Freeze Audit and Select Vehicle states respectively. The state diagram illustrated in FIG. 11 is embodied in the configuration of the Touch Screen 1050 and the data displayed on each screen is polled from the Modbus Daemon 1020. When the user presses a button on the touch screen, this information is communicated to Modbus Daemon 1020.

Figure 12:
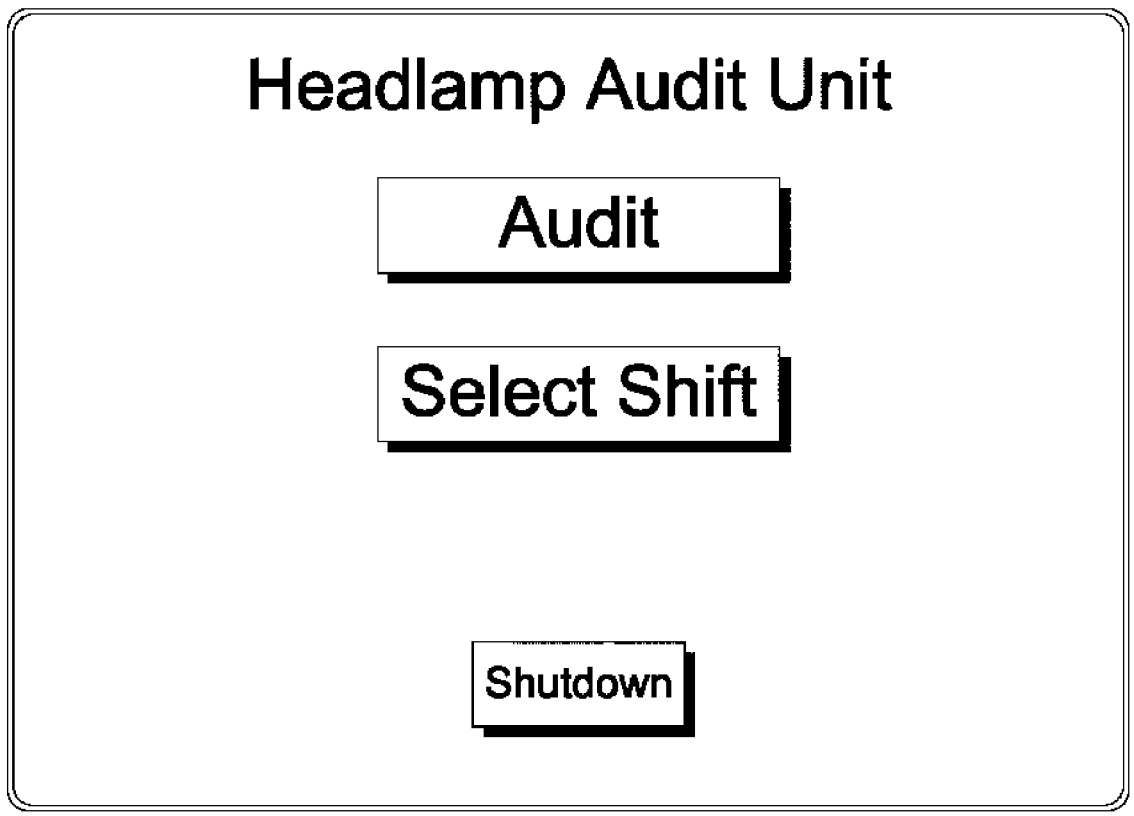
FIG. 12 illustrates the startup screen for the touch screen in an embodiment of the invention.
Figure 13:
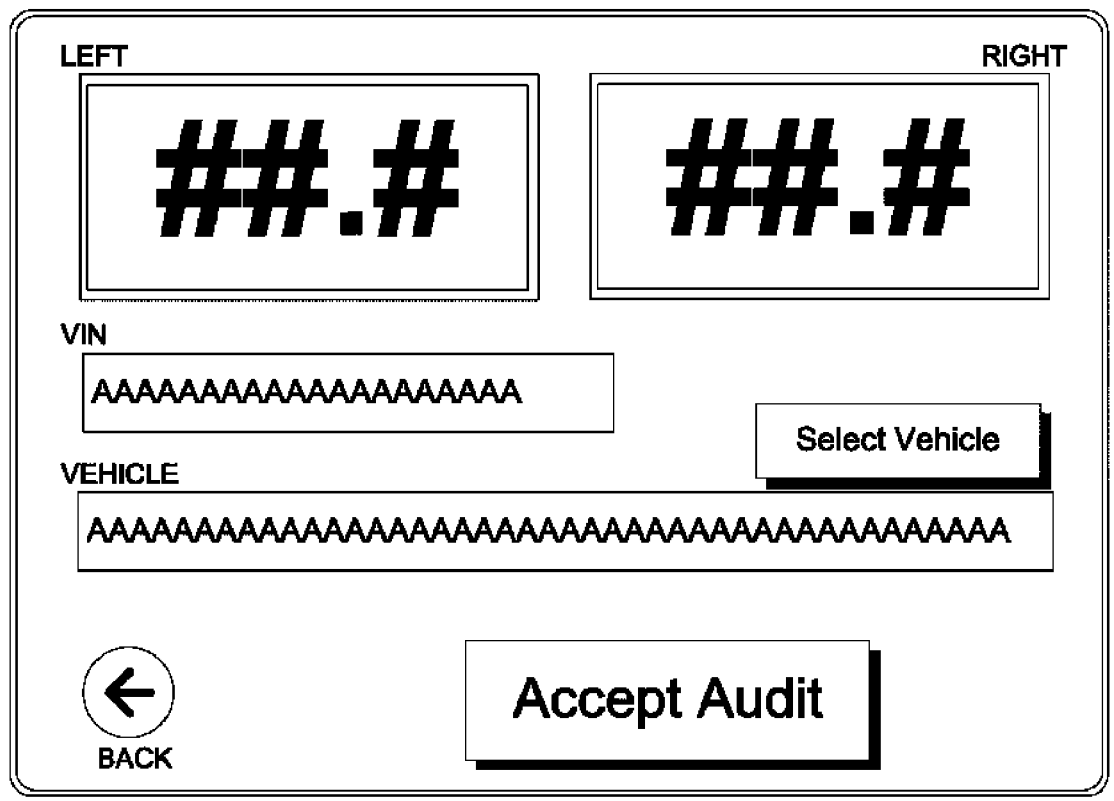
FIG. 13 illustrates the real-time audit screen for the touch screen in an embodiment of the invention.

Main Menu state 110 is entered upon power up. The screen displayed to the user is illustrated in FIG. 12. The user has the option of entering Real-Time Audit state 112 by pressing the Audit button or the Select Shift state 118 by pressing the Select Shift button or may shutdown by pressing the Shutdown button. The Shutdown button is used to trigger a clean shutdown of the Unix operating system so that data is not lost and the CF flash card is not corrupted. In the Real-Time Audit state 112, the screen displayed to the user is illustrated in FIG. 13. Computed left and right audit positions are displayed in the boxes labeled "LEFT" and "RIGHT" respectively. The Modbus Daemon requests audit data from the ZIB Daemon approximately every 500 ms in one embodiment, so the data shown on the Real-Time Audit screen will change at most about every half second. However, in a typical environment the data will not change if the vehicle is not moving and the light patterns are stable. The VIN and Vehicle boxes on the Real-Time Audit screen are filled in with the VIN number and the name of the selected vehicle, if a vehicle has been selected. If no vehicle has been selected a button labeled "Select Vehicle" appears. If a vehicle has been selected, a button labeled "Clear Vehicle" (not shown) appears in the same location.

Figure 14:
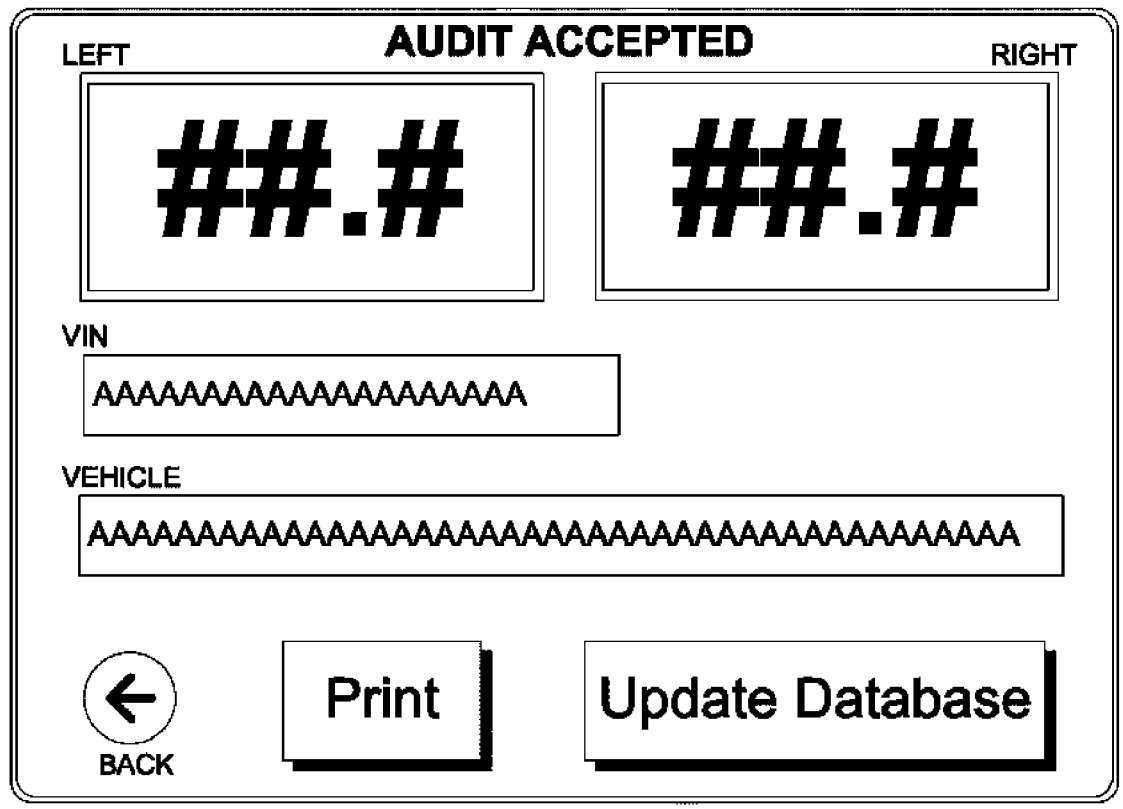
FIG. 14 illustrates the freeze audit screen for the touch screen in an embodiment of the invention.

From the Real-Time Audit state 112, the user may enter the Freeze Audit state 114 by pressing the "Accept Audit" button. The screen displayed to the user in the Freeze Audit state 114 is illustrated in FIG. 14. In the Freeze Audit screen the label "AUDIT ACCEPTED" appears and the numbers in the "LEFT" and "RIGHT" boxes will not change, even if the vehicle is moved or the light pattern changes. From this screen the user may select "Print" which causes audit information to be sent to the attached printer, or may select "Update Database" which causes audit information to be transmitted to a manufacturing database over the plant network. In either case the touch screen remains in the Freeze Audit state until the user presses the "Back" button, which returns the touch screen to the Real-Time Audit state.

Figure 15:
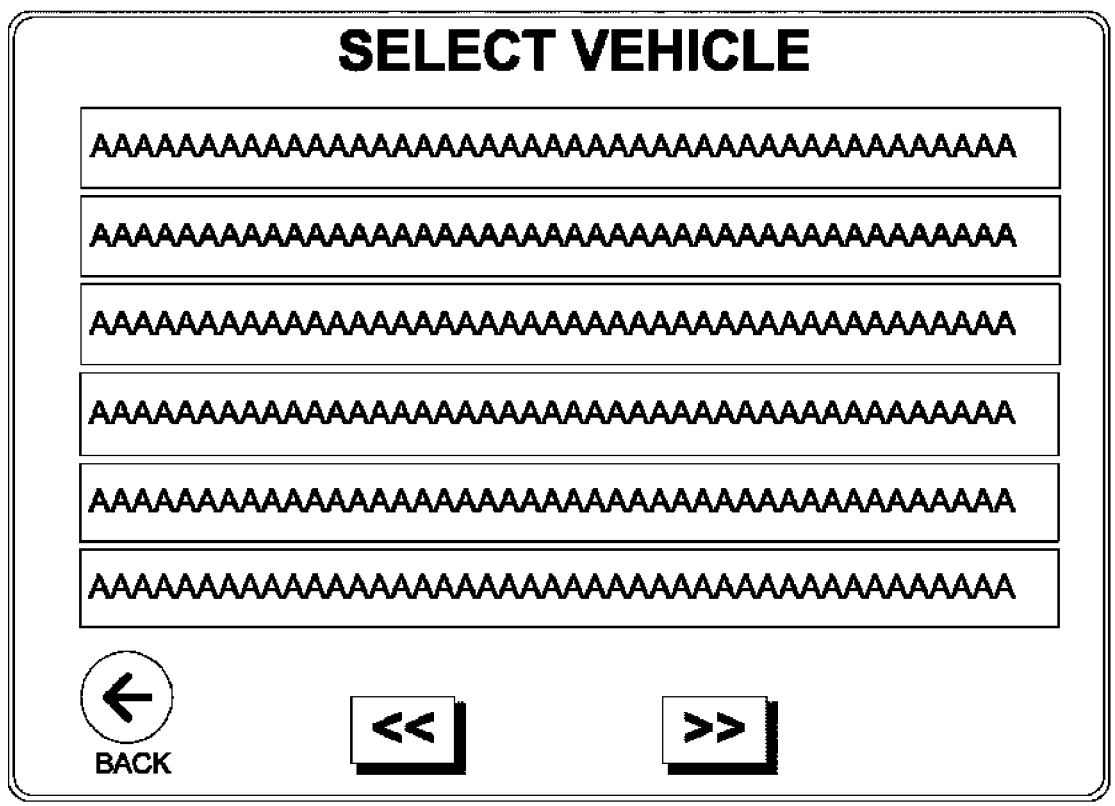
FIG. 15 illustrates the select vehicle screen for the touch screen in an embodiment of the invention.

If the Select Vehicle button is pressed in the Real-Time Audit state, the touch screen goes to the Select Vehicle state 116. The screen displayed to the user in the Select Vehicle state is illustrated in FIG. 15. The Select Vehicle state displays the names of the vehicle specifications as they have been configured in the vehicle configuration file that is stored on the CF flash card. The vehicle configuration file is an XML formatted file that defines any number of vehicles and specifies audit parameters associated with each. If there are more than six vehicles in the vehicle configuration files, the user may scroll through the list of names by using the next and previous buttons on the Select Vehicle screen. The vehicle configuration file can be managed through the Web interface.

Manual selection of a vehicle through the Select Vehicle screen is normally not necessary. Normally the scan of a VIN number in conjunction with the manufacturing build database is sufficient to select the proper vehicle. Manual selection of a vehicle may be necessary when: 1. there is no VIN number available, so no automatic lookup can be performed; 2. the manufacturing build database is not accessible or the vehicle has been removed from the build database; or 3. the vehicle specifications as configured do not properly capture the particular vehicle being audited. When a vehicle selection is made in the Select Vehicle state 116, the touch screen returns to the Real-Time Audit state 114. Additionally the selection of the vehicle is communicated from the touch screen to the Modbus Daemon, which then communicates this information to the ZIB Daemon. The ZIB Daemon will then load the audit information from the vehicle configuration file and start using it to update the left and right audit locations.

CGI Scripts 1040 are used for a variety of functions in connection with the Web interface to single board computer 62 through the on-board Web server. The Web interface to the host control unit can be accessible through Config/Diag port 69B, through the Plant Network port 69A or both. Typically a laptop computer is connected to the Config/Diag port 69B to utilize the Web interface. The main functions of the Web interface are as follows:

Audit Analysis—viewing illumination curves and updating audit parameters.

Vehicle Specifications—creating and editing vehicle specifications.

Plant Network Diagnostics—testing communication to the manufacturing databases accessible over the plant network.

System Configuration—updating global system parameters including IP addresses and network parameters.

View Audit Logs—viewing logged audit information including logged illumination curves.

System Status—viewing the status of the plant network and the status of all connected sensor units, including serial number, internal temperature and input voltage.

Set Date and Time—setting the real time clock (important so that logged time is accurate.)

Figure 16:
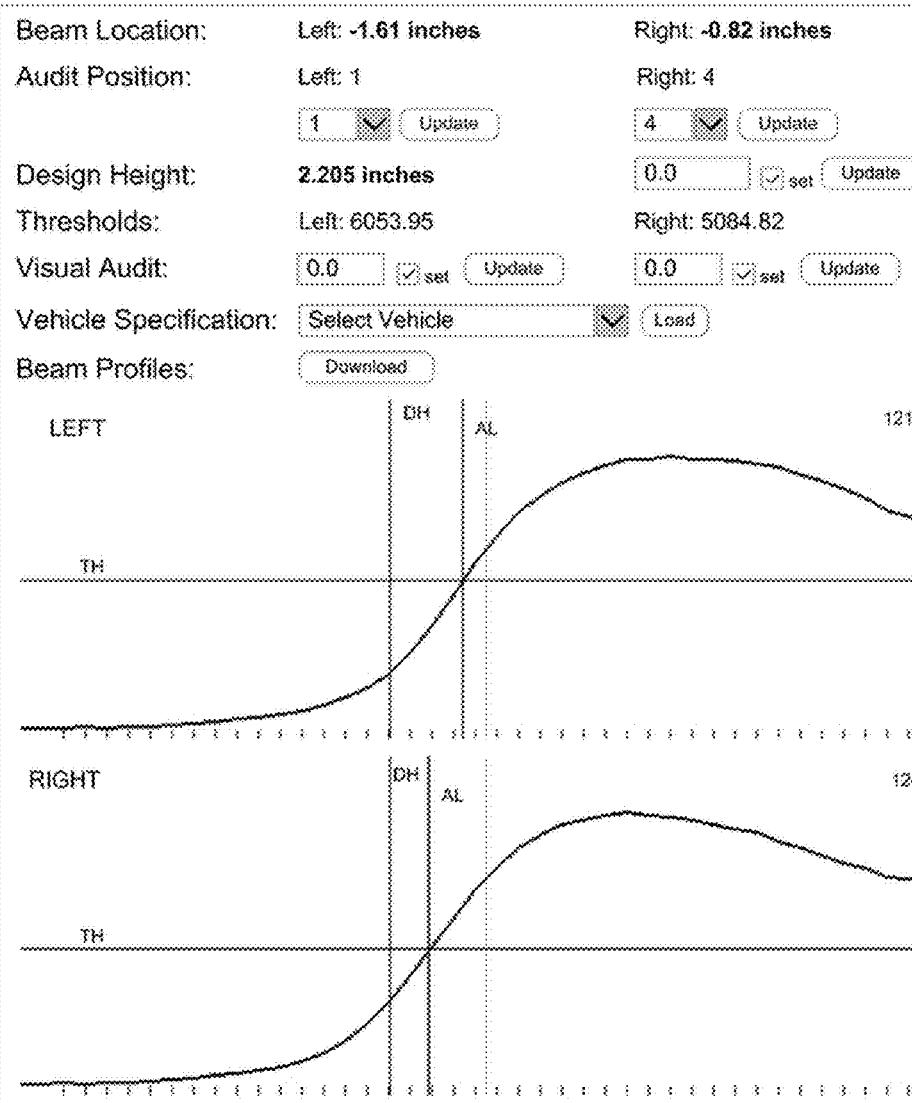
FIG. 16 illustrates a Web page used for audit analysis in an embodiment of the invention.

With regard to the "Audit Analysis" function, an example of a display of the Audit Analysis web page is illustrated in FIG. 16. FIG. 16 illustrates the current audit location in the row entitled "Beam Location." This information is retrieved from the ZIB Daemon and is base on the current real-time audit of the vehicle that is currently illuminating the sensor units. The next line in FIG. 16 illustrates the audit positions for the vehicle being audited, which are currently set to sensor #1 and sensor #4 in this example. The user may change the selected audit positions from the screen by selecting a sensor from the pull down menu and clicking on the "Update" button. This action causes a CGI Script to notify the ZIB Daemon that a different sensor unit should be used for auditing. Normally the appropriate sensor unit is specified as part of the vehicle specification file. The ability to manually select the sensor unit is used to generate audit data for a new car for which there is not yet a vehicle specification.

The next line on FIG. 16 is the design height, which is discussed above. The user may change the current design height using the text box and the "Update" button. This causes a CGI Script to notify the ZIB Daemon so that it can compute audit locations using the updated design height. The next line in FIG. 16 illustrates the currently set illumination thresholds for the left and right.

The next line on FIG. 16 illustrates an important feature of the Audit Analysis page which is the "rezero" feature. This is the manner in which a visual audit of the headlamp beam is utilized to generate illumination thresholds. When a vehicle is first being configured, the beam may be visually audited, and then the "Update" button will be used to back-compute the thresholds from the specified audit location. For example, if the visual audit box is set to zero, then the point where the design height intersects the illumination curve will be computed and the resulting threshold will be updated as the active threshold. These threshold numbers may then be entered into a vehicle specification.

The next line on FIG. 16 allows for the manual selection of a vehicle from the list of configured vehicles. When the "Load" button is clicked, a CGI Script will notify both the Modbus Daemon and the ZIB Daemon that a vehicle has been selected, and each daemon will then read the configuration file and use the appropriate vehicle specification.

At the bottom of FIG. 16 are images of illumination curves. Examples of these curves are discussed above in connection with FIG. 3. In the case of the Audit Analysis Web page, these images are automatically generated based on the real-time information received from the sensor units. When the Audit Analysis page is entered, a CGI Script retrieves the illumination curves from the ZIB daemon and then calls a program that generates two JPEG files, one for the left and one for the right. The JPEG files are labeled with the threshold location, design height and audit location if known. The JPEGS are automatically scaled to the maximum intensity to allow ease of viewing. The user may click the "refresh" button to generate a new set of JPEG images. In alternative embodiments, the Audit Analysis may be configured to automatically refresh so that updated illumination curves can be observed without any user action.

The foregoing descriptions of the embodiments of the present invention have been presented for purposes of illustration and description only. They are not intended to be exhaustive or to limit the present invention to the forms disclosed. Accordingly, many modifications and variations will be apparent to practitioners skilled in the art. The scope of present invention is defined by the appended claims.

The invention claimed is:

1. A system for detecting the aim of vehicle headlamps comprising:
one or more sensor units, each of said sensor units comprising:
a microcontroller;
a plurality of photosensors arranged in a substantially linear array;
a memory storing program code, wherein execution of said program code by said microcontroller provides for the processing of data representing illumination of said plurality of photosensors; and
a host control unit coupled to said one or more sensor units comprising:
an embedded computer subsystem with a memory storing program code wherein execution of said program code by said embedded computer subsystem implements a multi-tasking operating system;
wherein said one or more sensor units operate substantially independently from said host control unit in said processing of said data.

2. The system of claim 1, said host control unit further comprising:
a network interface configured to communicate with a user computer running a web browser;
wherein execution of said program code by said embedded computer subsystem further implements a web based interface to said host control unit.

3. The system of claim 2 wherein said web based interface comprises a graphical display of an illumination level detected by said photosensors and wherein said host control unit is configured to receive illumination data from said one or more sensor units and dynamically generate an image for display on said web based interface.

4. The system of claim 3 wherein said graphical display comprises a simultaneous display of both left and right headlamps for a vehicle.

5. The system of claim 2 wherein said web based interface further comprises the ability to set a threshold level for computing a headlamp beam position.

6. The system of claim 2 wherein said web based interface further comprises the ability to set a design height for computing a headlamp beam position.

7. The system of claim 2 comprising a plurality of sensor units and wherein said web based interface allows the selection of a sensor unit among said plurality of said sensor units for display of illumination data.

8. The system of claim 7 wherein said web based interface allows selection of a left sensor unit among said plurality of sensor units and selection of a right sensor unit among said plurality of sensor units.

9. The system of claim 1 wherein said host control unit is coupled to said one or more sensor units through a serial port.

10. The system of claim 1 wherein said host control unit is coupled to said one or more sensor units through a broadcast serial bus.

11. The system of claim 1 wherein said one or more sensor units comprise at least two sensor units coupled to said host control unit and wherein said sensor units are positioned at predetermined locations relative to a vehicle being audited.

12. The system of claim 1, said host control unit further comprising:
   a touch screen configured to display headlamp aim information and to accept user input;
   a network interface configured to communicate with a plant management system;
   wherein execution of said program code by said embedded computer subsystem further implements an interface between said touch screen and said plant management system.

13. The system of claim 12 wherein said interface is configured to transmit headlamp aim information to a remote database over said network interface.

14. The system of claim 1 wherein said embedded computer subsystem comprises a diskless single board computer utilizing non-volatile memory for storage.

15. The system of claim 1 wherein said host control unit is further configured to log headlamp illumination data.

16. A method for detecting the aim of vehicle headlamps comprising the steps of:
   providing one or more sensor units, each of said sensor units comprising:
      a microcontroller;
      a plurality of photosensors arranged in a substantially linear array;
      a memory storing program code, wherein execution of said program code by said microcontroller provides for the processing of data representing illumination of said plurality of photosensors;
   providing a host control unit coupled to said one or more sensor units comprising:
      an embedded computer subsystem with a memory storing program code wherein execution of said program code by said embedded computer subsystem implements a multi-tasking operating system;
      wherein said one or more sensor units operate substantially independently from said host control unit in said processing of said data;
   positioning a vehicle a predetermined distance from said one or more sensor units;
   energizing a headlamp of said vehicle such that at least one of said one or more sensor units is illuminated by said headlamp;
   recording headlamp aim information that is based on a measurement of an illumination level of at least one of said one or more sensor units.

17. The method of claim 16 wherein said host control unit further comprises:
   a network interface configured to communicate with a user computer running a web browser;
   wherein execution of said program code by said embedded computer subsystem further implements a web based interface to said host control unit.

18. The method of claim 17 wherein said web based interface comprises a graphical display of an illumination level detected by said photosensors and wherein said host control unit is configured to receive illumination data from said one or more sensor units and dynamically generate an image for display on said web based interface.

19. The method of claim 18 wherein said graphical display comprises a simultaneous display of both left and right headlamps for a vehicle.

20. The method of claim 18 wherein said web based interface further comprises the ability to set a threshold level for computing a headlamp beam position.

21. The method of claim 18 wherein said web based interface further comprises the ability to set a design height for computing a headlamp beam position.

22. The method of claim 18 wherein said step of providing one or more sensor units comprises providing a plurality of sensor units and wherein said web based interface allows the selection of a sensor unit among said plurality of said sensor units for display of illumination data.

23. The method of claim 22 wherein said web based interface allows selection of a left sensor unit among said plurality of sensor units and selection of a right sensor unit among said plurality of sensor units.

24. The method of claim 16 wherein said host control unit is coupled to said one or more sensor units through a serial port.

25. The method of claim 16 wherein said host control unit is coupled to said one or more sensor units through a broadcast serial bus.

26. The method of claim 16 wherein said one or more sensor units comprise at least two sensor units coupled to said host control unit and wherein said sensor units are positioned at predetermined locations relative to a vehicle being audited.

27. The method of claim 16 wherein said host control unit further comprises:
   a touch screen configured to display headlamp aim information and to accept user input;
   a network interface configured to communicate with a plant management system;
   wherein execution of said program code by said embedded computer subsystem further implements an interface between said touch screen and said plant management system.

28. The method of claim 27 wherein said interface is configured to transmit headlamp aim information to a remote database over said network interface.

29. The method of claim 16 wherein said embedded computer subsystem comprises a diskless single board computer utilizing a non-volatile memory card for permanent storage.

30. The method of claim 16 wherein said host control unit is further configured to log headlamp illumination data.

* * * * *